(12) United States Patent
O'Brien et al.

(10) Patent No.: US 11,308,298 B2
(45) Date of Patent: *Apr. 19, 2022

(54) TOOLING SYSTEM

(71) Applicant: DIFR-TEK DIGITAL, LLC, Royal Oak, MI (US)

(72) Inventors: Geoffrey C. O'Brien, Washington, MI (US); Sean M. Brolley, Royal Oak, MI (US)

(73) Assignee: Difr-Tek Digital, LLC, Royal Oak, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 16/208,170

(22) Filed: Dec. 3, 2018

(65) Prior Publication Data
US 2019/0102589 A1 Apr. 4, 2019

Related U.S. Application Data

(63) Continuation of application No. 15/681,956, filed on Aug. 21, 2017, now Pat. No. 10,146,976, which is a
(Continued)

(51) Int. Cl.
*G06K 7/14* (2006.01)
*G06K 7/10* (2006.01)
(Continued)

(52) U.S. Cl.
CPC ............ *G06K 7/1417* (2013.01); *B29C 33/70* (2013.01); *B29C 45/17* (2013.01); *G05B 19/18* (2013.01); *G06F 16/13* (2019.01); *G06F 16/955* (2019.01); *G06F 16/9538* (2019.01); *G06F 16/9554* (2019.01); *G06K 7/10297* (2013.01); *G06K 7/10366* (2013.01); *G06K 7/1413* (2013.01);
(Continued)

(58) Field of Classification Search
CPC ........ G06F 16/00; G06F 16/381; G06K 19/00
USPC .......................... 235/375, 487, 462.09, 385
See application file for complete search history.

(56) References Cited

U.S. PATENT DOCUMENTS 4,533,823 A 8/1985 Vittorio
5,046,014 A 9/1991 Anjo
(Continued)

OTHER PUBLICATIONS

Wasp Barcode Technologies MobileAsset Complete Asset Management Solutions Quick-Start Guide (c) 2010, retrieved from the Internet at http://www.waspbarcode.com/~/media/PDFs/WaspBarcode/Products/Barcode-Software-PDFs/MobileAsset-PDFs/Mobile-Asset.ashx on Apr. 2, 2014.
(Continued)

*Primary Examiner* — Edwyn Labaze
(74) *Attorney, Agent, or Firm* — Fishman Stewart PLLC

(57) ABSTRACT

A tooling system may comprise a device configured to communicate with an identifier of a machine tool and a tool database having tool information including a predefined proximity associated with the identifier. The device may be configured to automatically activate, without a user-initiated scan, communication with at least one of the machine tool and the tool database in response to the identifier being within the predefined proximity. The device may also be configured to transfer tool information of the machine tool with respect to the tool database.

18 Claims, 20 Drawing Sheets

Related U.S. Application Data continuation-in-part of application No. 15/075,650, filed on Mar. 21, 2016, now Pat. No. 9,740,790, which is a continuation-in-part of application No. 14/266,423, filed on Apr. 30, 2014, now Pat. No. 9,292,811, which is a continuation-in-part of application No. 13/690,097, filed on Nov. 30, 2012, now abandoned.

(60) Provisional application No. 61/605,366, filed on Mar. 1, 2012.

(51) Int. Cl.

| | | |
|---|---|---|
| *G06Q 10/06* | (2012.01) | |
| *G06Q 10/08* | (2012.01) | |
| *G06Q 50/04* | (2012.01) | |
| *G06F 16/13* | (2019.01) | |
| *G06F 16/955* | (2019.01) | |
| *B29C 45/17* | (2006.01) | |
| *B29C 33/70* | (2006.01) | |
| *G05B 19/18* | (2006.01) | |
| *G06F 16/9538* | (2019.01) | |
| *B29C 31/00* | (2006.01) | |

(52) U.S. Cl.
CPC ............ *G06Q 10/06* (2013.01); *G06Q 10/087* (2013.01); *G06Q 50/04* (2013.01); *B29C 31/006* (2013.01); *B29C 2033/705* (2013.01); *B29C 2045/1796* (2013.01); *G05B 2219/37137* (2013.01); *G05B 2219/49304* (2013.01); *G05B 2219/50275* (2013.01)

(56) References Cited

U.S. PATENT DOCUMENTS

| | | | |
|---|---|---|---|
| 5,246,362 A | 9/1993 | Kobayashi et al. | |
| 5,595,560 A | 1/1997 | Kamada | |
| 5,979,764 A | 11/1999 | Swyst et al. | |
| 5,983,688 A | 11/1999 | Anzai et al. | |
| 6,365,074 B1 | 4/2002 | Su | |
| 6,659,098 B1 | 12/2003 | Sekiya | |
| 6,989,749 B2* | 1/2006 | Mohr | G06Q 10/087 235/385 |
| 7,835,815 B2 | 11/2010 | Shigefuji et al. | |
| 8,010,483 B2 | 8/2011 | Huang et al. | |
| 8,842,183 B2* | 9/2014 | Glickman | G06K 9/00 348/165 |
| 2002/0056749 A1 | 5/2002 | Hetzer | |
| 2003/0055753 A1 | 3/2003 | Dellar et al. | |
| 2003/0069977 A1 | 4/2003 | Heiden | |
| 2003/0102970 A1* | 6/2003 | Creel | B25H 3/00 340/568.1 |
| 2003/0204372 A1 | 10/2003 | Ng | |
| 2003/0229414 A1* | 12/2003 | Nakazawa | G05B 19/408 700/175 |
| 2004/0217864 A1* | 11/2004 | Nowak | G06K 17/0022 340/572.1 |
| 2004/0262795 A1 | 12/2004 | Slack et al. | |
| 2005/0149216 A1* | 7/2005 | Popplewell | G05B 19/12 700/96 |
| 2006/0200261 A1 | 9/2006 | Monette et al. | |
| 2007/0010721 A1 | 1/2007 | Chen et al. | |
| 2007/0107211 A1 | 5/2007 | Bainbridge | |
| 2008/0058993 A1* | 3/2008 | Tain | G05B 19/41845 700/275 |
| 2008/0088454 A1* | 4/2008 | Flores | G06Q 10/087 340/572.4 |
| 2009/0072029 A1* | 3/2009 | Martin | G06Q 10/087 235/385 |
| 2009/0115609 A1 | 5/2009 | Weaver | |
| 2009/0307013 A1 | 12/2009 | Altounian et al. | |
| 2010/0228648 A1 | 9/2010 | Zhou et al. | |
| 2010/0252626 A1* | 10/2010 | Elizondo | G06Q 10/087 235/385 |
| 2010/0325084 A1 | 12/2010 | Huang et al. | |
| 2011/0184550 A1* | 7/2011 | Mier | B29C 45/78 700/202 |
| 2012/0063288 A1* | 3/2012 | Fujita | G11B 7/126 369/116 |
| 2012/0310397 A1* | 12/2012 | Rataul | G05B 19/4188 700/95 |
| 2013/0103794 A1 | 4/2013 | Starkey | |
| 2013/0109375 A1 | 5/2013 | Zeiler et al. | |
| 2013/0137468 A1* | 5/2013 | Kahle | G06Q 50/08 455/457 |
| 2013/0138466 A1* | 5/2013 | Kahle | G06Q 10/063114 705/7.15 |
| 2013/0176113 A1* | 7/2013 | Mallin | G06Q 10/06 340/10.1 |
| 2013/0293410 A1* | 11/2013 | Hieronimi | G01S 13/74 342/190 |
| 2013/0299569 A1 | 11/2013 | Gentile et al. | |
| 2013/0321129 A1* | 12/2013 | Swenson, Jr | G06Q 10/08 340/8.1 |
| 2015/0069119 A1* | 3/2015 | Hastman | G06Q 10/087 235/385 |
| 2016/0041547 A1* | 2/2016 | Mackman | G05B 19/4093 700/186 |
| 2016/0179909 A1* | 6/2016 | Wells | G06F 16/903 235/385 |
| 2016/0307150 A1* | 10/2016 | Rogers | B25H 3/028 |
| 2018/0039807 A1 | 2/2018 | O'Brien et al. | |
| 2018/0308049 A1* | 10/2018 | Katz | G06Q 10/0875 |
| 2019/0375108 A1* | 12/2019 | Boudreau | B25J 11/008 |
| 2021/0178554 A1* | 6/2021 | Eckel | G06K 19/0723 |

OTHER PUBLICATIONS

Wasp Barcode Technologies MobileAsset Users' Manual Web Module (c) 2010, retrieved from the Internet at http://dl.waspbarcode.com/wasp/supportfiles/MobileAsset_Web_Manual.pdf on Apr. 2, 2014.

Web product tour video of Wasp Barcode Technologies MobileAsset System, located at http://www.waspbarcode.com/Asset-Tracking/Product-Tour/MobileAsset-Product-Tour, retrieved on Apr. 2, 2014.

Web product tour video of Wasp Barcode Technologies MobileAsset Pro System, located at http://www.waspbarcode.com/asset-tracking/product-tour/mobileasset-pro-product-tour, retrieved on Apr. 2, 2014.

\* cited by examiner

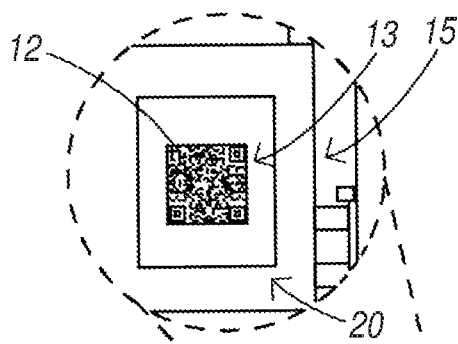
FIG. 1A
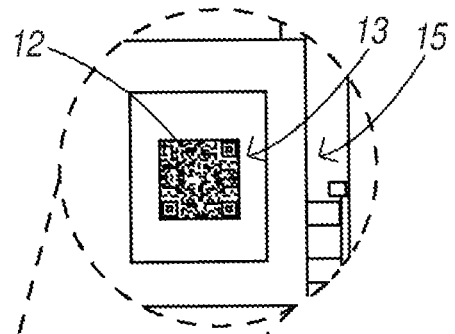
FIG. 1B
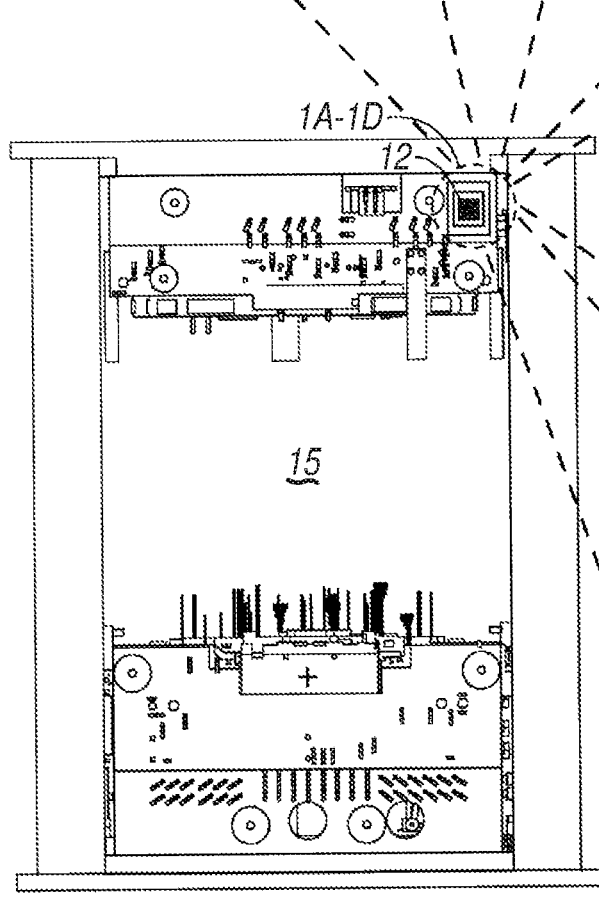
FIG. 1
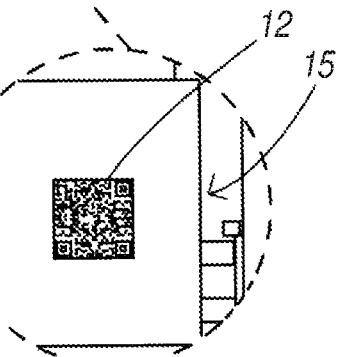
FIG. 1C
FIG. 1D

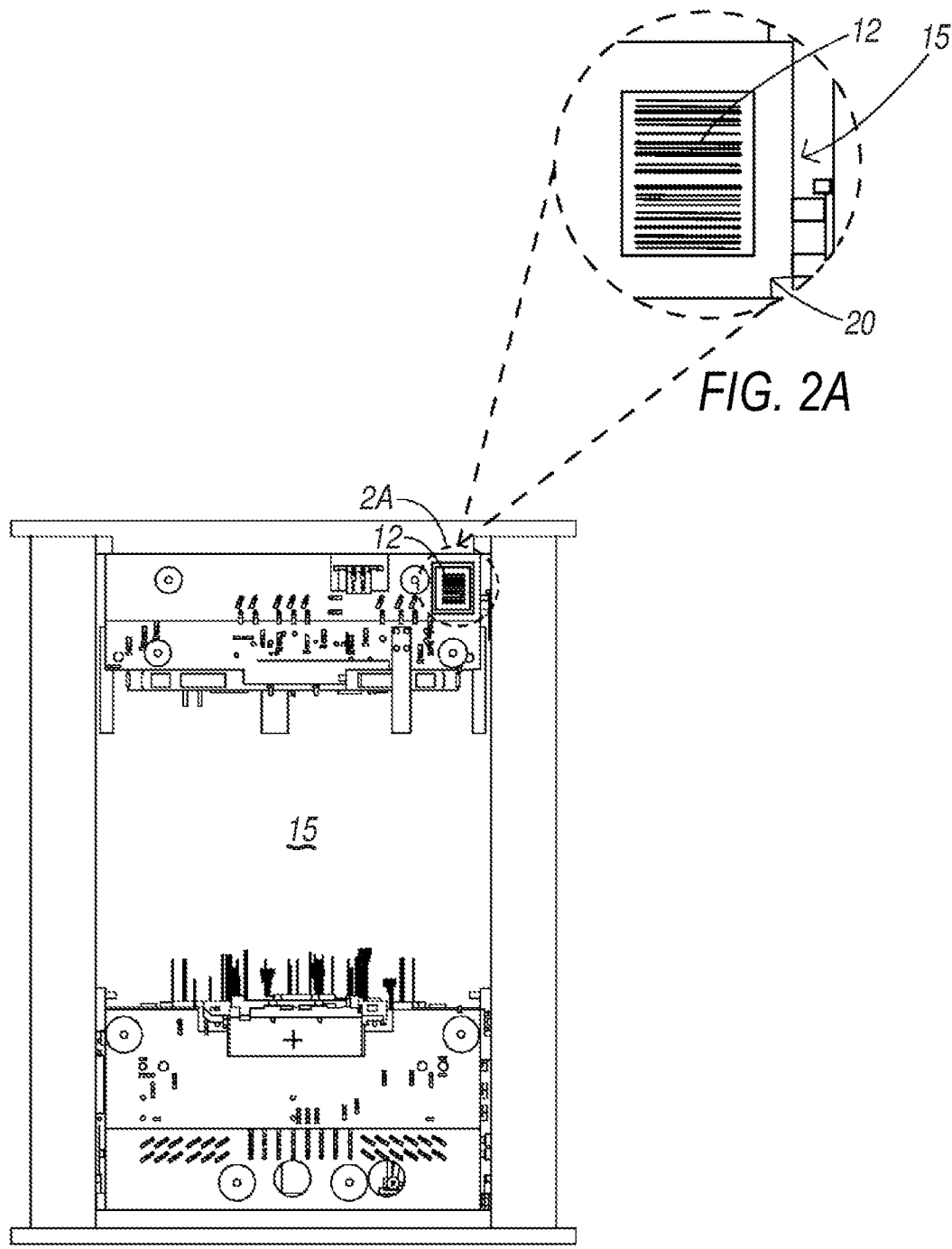

FIG. 22

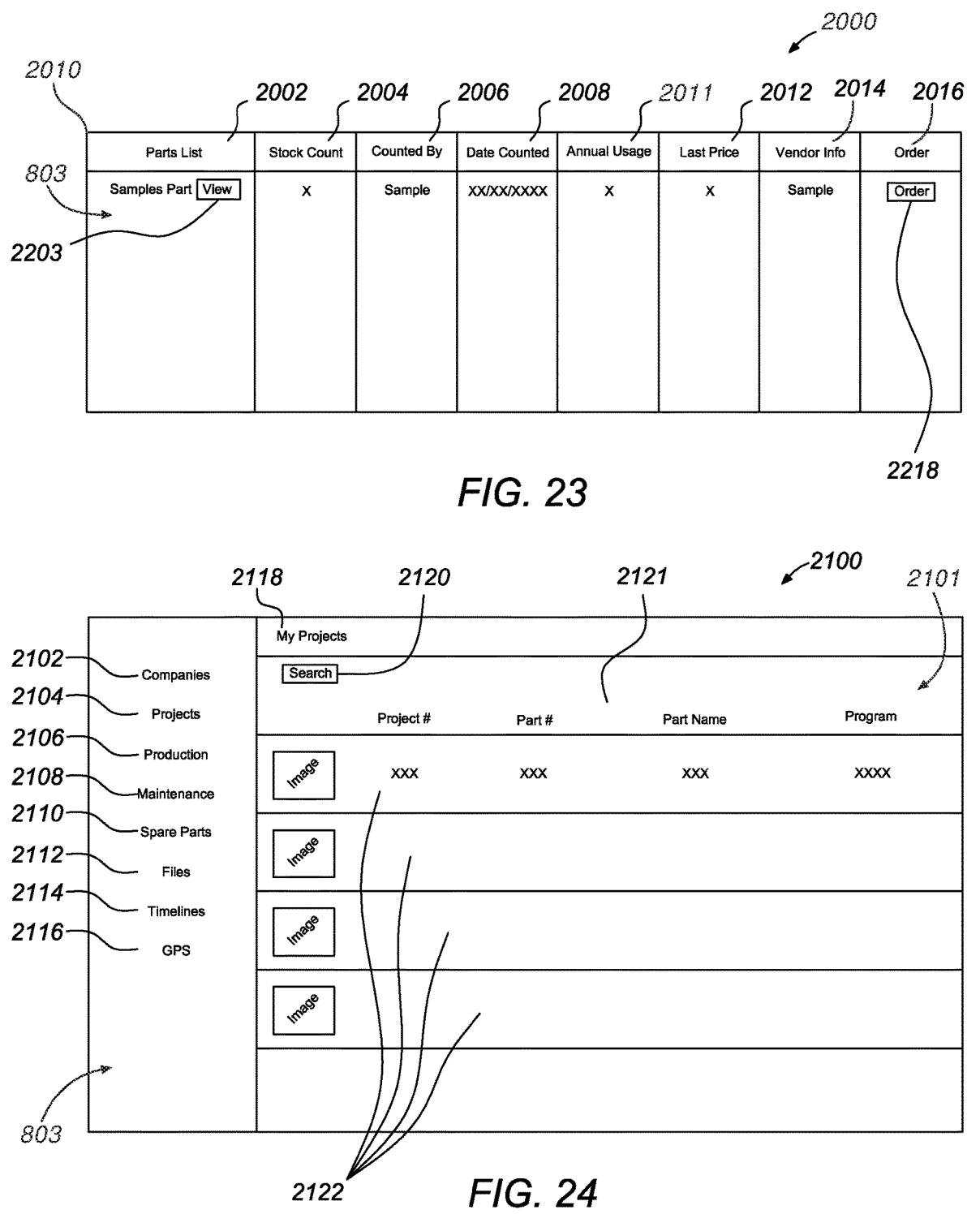

| Parts List | Stock Count | Counted By | Date Counted | Annual Usage | Last Price | Vendor Info | Order |
|---|---|---|---|---|---|---|---|
| Samples Part [View] | X | Sample | XX/XX/XXXX | X | X | Sample | [Order] |

FIG. 23

- Companies
- Projects
- Production
- Maintenance
- Spare Parts
- Files
- Timelines
- GPS My Projects

[Search]

| | Project # | Part # | Part Name | Program |
|---|---|---|---|---|
| Image | XXX | XXX | XXX | XXXX |
| Image | | | | |
| Image | | | | |
| Image | | | | |

FIG. 24

TOOLING SYSTEM

RELATED APPLICATIONS

This application is a Continuation of and claims priority to U.S. patent application Ser. No. 15/681,956 filed Aug. 21, 2017, now U.S. Pat. No. 10,146,976, which is a Continuation-In-Part Application of and claims priority to U.S. patent application Ser. No. 15/075,650 filed Mar. 21, 2016, now U.S. Pat. No. 9,740,790, issued Aug. 22, 2017, which is a Continuation-In-Part Application of and claims priority to U.S. patent application Ser. No. 14/266,423 filed Apr. 30, 2014, now U.S. Pat. No. 9,292,811, issued Mar. 22, 2016, which is a Continuation-In-Part Application of and claims priority to U.S. patent application Ser. No. 13/690,097 filed Nov. 30, 2012, which is based on and claims priority to U.S. Provisional Patent Application No. 61/605,366 filed Mar. 1, 2012, all of which are incorporated by reference in their entirety.

FIELD OF TECHNOLOGY

The present disclosure relates to systems using tool identifiers including machine readable labels on tools. More specifically, it includes a system that utilizes machine readable labels, such as barcodes, that are integrated with, or affixed to, molds and dies, or other assets used in the manufacturing of product, thereby permitting a user to access critical tool information, report issues, set alerts, and track tooling activity related to that specific tool.

BACKGROUND

Tools such as molds and dies are used to manufacture products such as plastic parts, e.g., those formed by injection molding. In order to use a given tool properly, the operator must possess certain information about the tool. Such critical information might include the tool manufacturer, process parameters, construction drawings, dimensional information and useful life of the tool. Often times these tools are sent from one plant to another, but critical information related to the tool is not provided, is incomplete, or is lost. This can be very problematic in a manufacturing setting where multiple tools are used, as it is not necessarily easy to distinguish one tool from another by mere inspection. It can be time consuming to perform the investigative work required to determine the identity of a specific tool, or even wasteful or dangerous if a misidentified tool is inadvertently used.

There is a need for a system that allows a tool manufacturer to provide critical information such as tool information that is related to the tool itself. It is desirable that the object with this information does not affect the performance of the tool, and that it is easily readable by the tool operator. It is also desirable that this information be dynamic insofar as it can be updated by the tool operator or agent thereof. Accordingly, the present disclosure provides improvements in this area.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

FIG. 1 represents a tool management system with a quick response (QR)-type barcode affixed to a tool, with various embodiments of a QR-type barcode being depicted in the exploded views of FIGS. 1A-1D;

FIG. 2 depicts a tool system having a UPC-type barcode inscribed directly on a tool, with the barcode shown in an exploded view in FIG. 2A;

FIG. 22 illustrates another exemplary user interface of FIG. 11 including, for example, spare parts information;

FIG. 23 illustrates an exemplary user interface of the present disclosure; and

FIG. 24 illustrates an exemplary user interface of the present disclosure.

DETAILED DESCRIPTION

Figure 3:
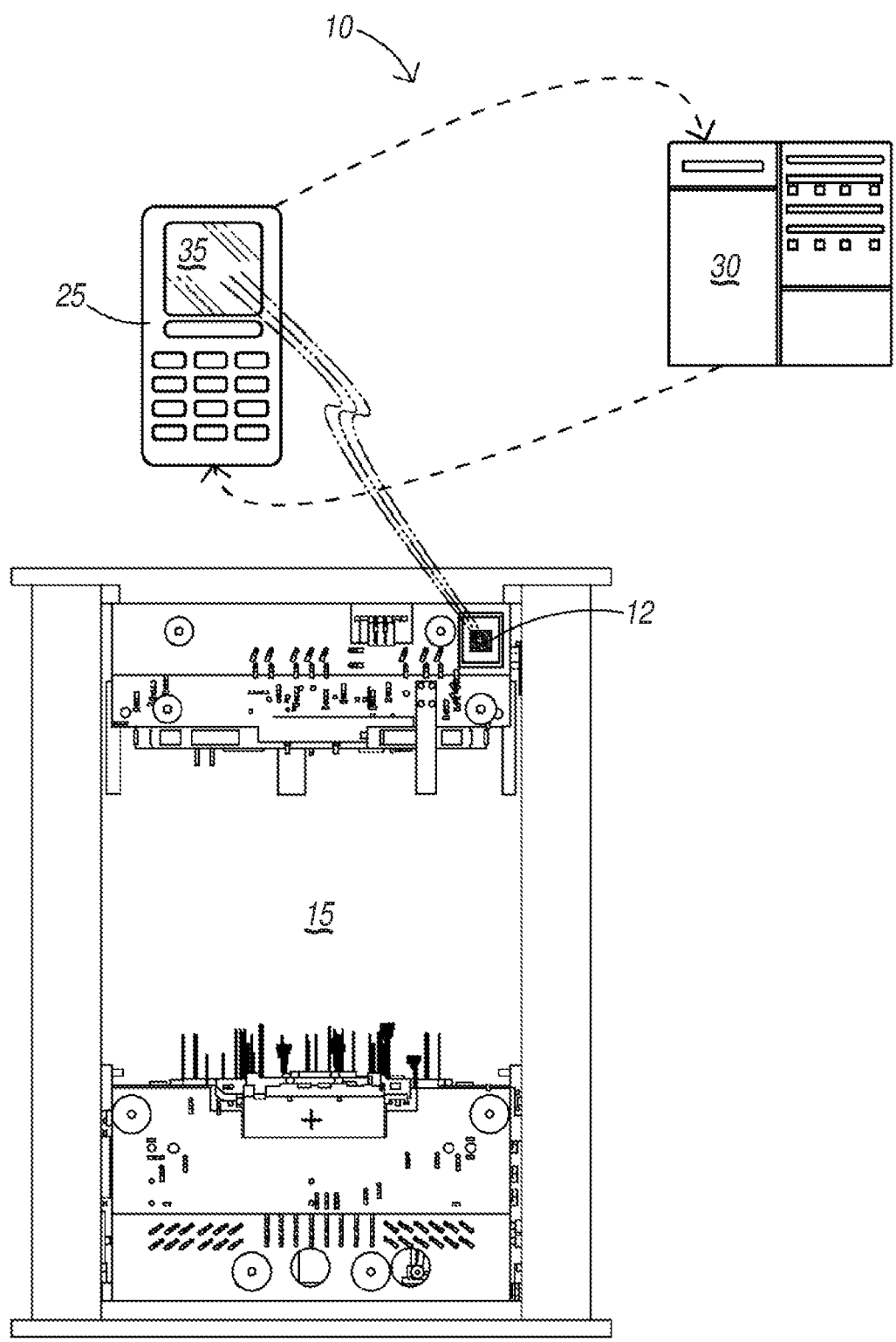
FIG. 3 schematically represents some components of a tool management system.

A system may be configured to utilize tool identifiers such as machine-readable labels affixed to tools for managing information related to those tools uses components such as barcodes, processors, and barcode readers. A specially created and unique barcode is created when a user creates a profile for a specific tool. This barcode is affixed to a tool in such a manner that the barcode does not interfere with use of the tool. The barcode preferably has additional human-readable printing which directs a user to a website. By accessing the website and scanning the barcode on the specific tool, a user is able to access pertinent information such as tool information related to that tool. Optionally, authorized users may also be able to update information related to that tool. In this manner, manuals, specifications and so forth that are associated with the tool can't be lost or misplaced. Examples of pertinent information include specifications, recalls, current or recommended hours of usage, liens and so forth.

A method of reporting metrics of the history of a tool that includes, but is not limited to, the ability to create, report, store, and communicate tool information such as machine tool details, parameters, usage, issues, maintenance actions, and or problems. Also, a method of generating a Preventative Maintenance (PM) Alert report which includes, but is not limited to, calendar data on when recommended maintenance for the tool is due or near due, generates periodic reminders, and can list PM steps to take. Additionally, a method of tracking the lifecycle count of a tool for use in a PM alert system. Also, a method of auto-populating a tool database. Finally, a method of tracking tool locations and updating tool metrics utilizing a GPS- and camera-enabled cellular phone.

Referring to FIG. 1, an information management system 10 may include, but is not limited to, a barcode 12, a barcode plate 13, a tool 15, a plaque 20, a barcode reader 25, a processor 30, and an output display 35. As used herein, a "tool" is a device, machine or apparatus that is portable and used in the manufacture of goods and products. Examples of "tools" include tool and dies, molds, controllers, machines, fixtures, hot runner systems, and secondary equipment.

As shown in FIG. 1A, barcode 12 maybe situated on barcode plate 13, which is affixed to plaque 20, with plaque 20 attached to a tool 15. In this manner barcode plate 13 is not directly attached to tool 15, as plaque 20 is sandwiched between.

In this embodiment it is possible that the barcode plate 13 substrate is aluminum, steel, with barcode 12 markings effectuated by printing, etching, laser imprinting, and inscribing. It is possible that surface of barcode plate 13 has approximate dimensions of 2.75 inches by 3.5 inches to 2.75 inches by 5 inches. Thickness of barcode plate 13 may be approximately 1 millimeter to 3 millimeters.

A plaque 20 has a substrate made of metal, such as but not limited to aluminum and/or steel, with surface dimensions of approximately 2.75" by 3.5" to 9" by 11". Thickness of plaque 20 is approximately 1 mm to 3 mm. It is desirable that plaque 20 is slightly larger than barcode plate 13.

Attachment of the various components, including barcode plate 13 and plaque 20 to tool 15, should be substantially permanent, yet not interfere with the operation of the tool. For example, in the case of a tool and die, barcode plate 13 and plaque 20 should be attached to the fixed (non-moving) portion of tool 15. Attachment of barcode plate 13 and plaque 20 to tool 15 can be effectuated by a variety of methods including, but not limited to, adhesion, welding, and bolting.

In an alternative embodiment, shown in FIG. 1B, barcode 12 is situated on barcode plate 13, which is attached directly to tool 15. In other words, there is no plaque 20. In yet another embodiment, shown in FIG. 1C, plaque 20 is inscribed with barcode 12, which is attached to tool 15. In other words, there is no barcode plate 13. In another exemplary embodiment, FIG. 1D presents a tool 15 having a barcode-like device 12 affixed or otherwise secured to a surface of the tool 15. As will be appreciated, the barcode 12 may attached to the tool 15 directly or indirectly by a variety of systems.

Turning now to FIG. 2, it is also within the scope of this disclosure to situate the barcode directly onto tool 15. In this embodiment there is no plaque 20 and no barcode plate 13. Such inscription can be by etching, engraving, laser engraving or the like.

A variety of barcode types or symbologies can be used, for example matrix (2D) such as QR, or linear (1D) such as UPC, as shown in FIGS. 1 and 2 respectively.

An overview of the tool management system 10 is schematically depicted in FIG. 3, wherein system 10 includes tool 15 having a tool identifier such as barcode 12; a barcode reader 25; an output display 35; and a processor 30. A user wanting critical information such as tool information related to tool 15 would use barcode reader 25 to scan barcode 12. Tool information may be interchangeably referred to as tool information 803 as described below. Reader 25 can be a variety of devices including a designated scanner, such as an optical scanner, a fixed light device, and/or photosensor device, or a so called mobile device, cellular phone, or "smart phone" with the appropriate application such as "Scan" or "mbarcode", as shown. The scanner may include an audio or verbal scanner, e.g., configured to receive a tool identifier by way of audio or voice recognition. The scanner, as part of or separate from the mobile device, may be configured to optically, audibly, or verbally receive the tool identifier, e.g., from the user speaking the tool identifier or from a machine read of the tool identifier attached to the tool. Reader 25 transmits a query to processor 30 for information linked to barcode 12, and processor 30 transmits critical information such as tool information to reader 25, for user's viewing through output display 35. Output display 35 may be included with barcode reader 25, for example a smart phone. This embodiment is depicted in FIG. 3. Processor 30 may include any or a combination of a web server, cloud computing server, tablets, smartphones, wireless devices, or other data processing and/or storage device.

Figures 4A, 4B:
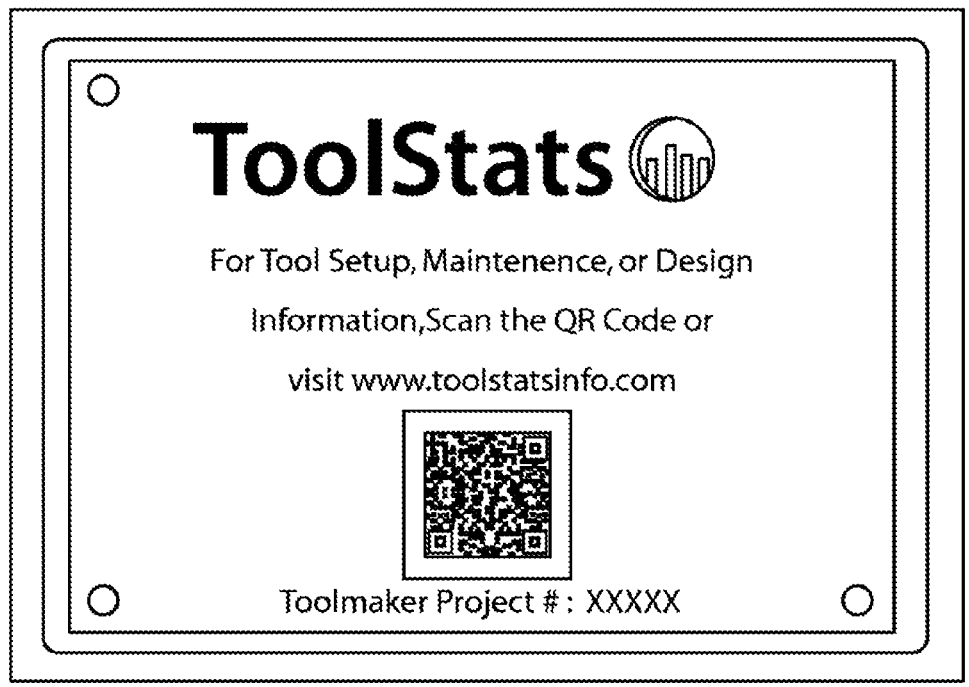
FIG. 4A represents a user interface for inputting information.
FIG. 4B represents a plaque on a tool.
Figure 4C:
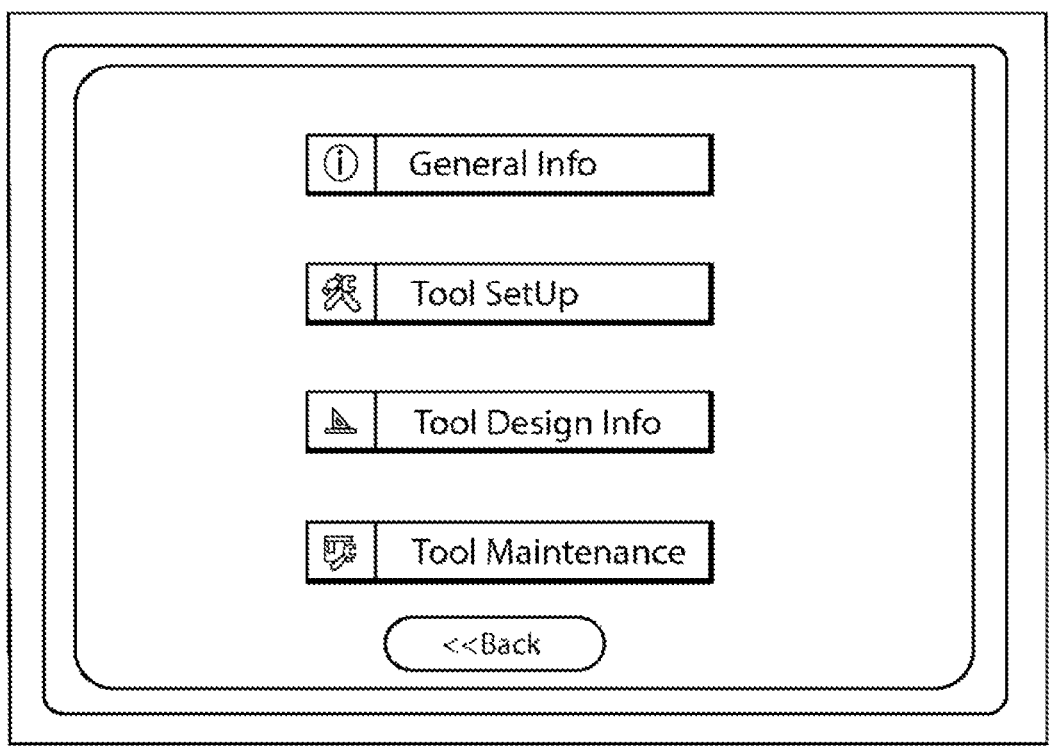
FIG. 4C represents a user interface for querying information.

An embodiment and method of using the system 10 is depicted in greater detail in FIGS. 4A-4C. FIG. 4A is a sample user interface that a user would enter information into so as to register a tool 15 which has not yet been registered. Other relevant information that could be useful in registering a tool includes tool information such as the date of manufacture, warranty information, authenticity of tool, tool set up, design information, and tool maintenance. Upon successfully entering information into the system, as set forth in FIG. 4A, a user receives, preferably by mail, a plaque including the associated barcode. This is depicted in FIG. 4B. The plaque is preferably printed or otherwise marked so as to direct future tool users to a website to query or update information linked to the tool. A subsequent tool user could obtain or update tool information about the tool 15 by scanning the barcode and accessing the website which is identified on the plaque of FIG. 4B, which would take them to a user interface such as that set forth in FIG. 4C. From there the user could obtain or update a variety of information.

Figure 5:
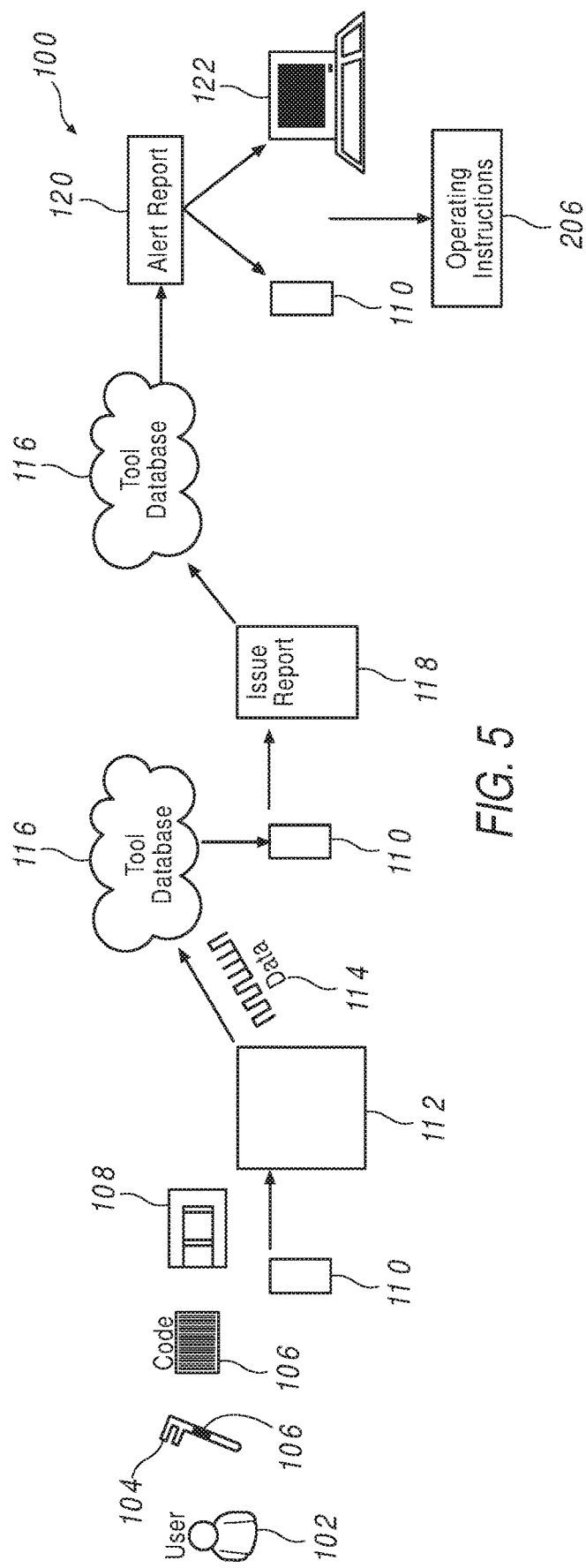
FIG. 5 illustrates a schematic diagram of a system and method of reporting metrics of the history of a tool.

One advantage of system 10 is that critical information such as tool information related to tool 15 can be updated as necessary, including corrections to specifications, additional safety warnings, messages that a tool is subject to a lien, or that the useful life of a tool is coming to an end. Such an update would be entered by way of the user interface into processor 30, so subsequent barcode reader 25 queries would yield this additional information on output display 35. It should be noted that a variety of information can be associated with each tool and should not be construed to be limited to that which is specifically set forth herein. FIG. 5 illustrates a schematic diagram and a method for reporting metrics of the history of a tool in order to create, report, store, and communicate tool information such as machine tool details, parameters, usage, issues, maintenance actions, and/or problems. The Issue Reporting System 100 and method is comprised of a tool operator 102, a machine tool 104, an optical or RF machine-readable representation of data 106 that is fixably attached to the machine tool 104, a scanner device 108, an input/output (I/O) device 110, a computer 112, machine tool data 114, a tool database 116, an issue report 118, an alert report 120, and a remote terminal 122.

The machine tool 104 is described as a device for shaping or machining metal or other rigid materials, usually by cutting, boring, grinding, shearing, or other forms of deformation. Machine tools are typically powered other than by human muscle (e.g., electrically, hydraulically, or via line shaft) and are used to make manufactured parts in various ways that include cutting or certain other kinds of deformation.

The Optical or RF machine-readable representation of data 114 (which is relating to the object to which it is attached) is commonly referred to as "Automatic Identification and Data Capture" (AIDC). AIDC refers to the methods of automatically identifying objects, collecting data about them, and entering that data directly into computer systems (i.e. without human involvement). AIDC may include bar codes, Radio Frequency Identification (RFID), biometrics, magnetic stripes, Optical Character Recognition (OCR), smart cards, and voice recognition. AIDC is also commonly referred to as "Automatic Identification," "Auto-ID," and "Automatic Data Capture." AIDC also refers to the methods of recognizing objects, getting information about them, and entering that data or feeding it directly into computer systems without any human involvement. AIDC capture technologies include optical/RF code devices, RFID, barcodes, OCR, magnetic stripes, smart cards and biometrics (like iris and facial recognition system).

The scanner 108 may include an optical and or electronic device for reading AIDC. In one example, the scanner 108 consists of a light source, a lens and a light sensor translating optical impulses into electrical signals. Other embodiments of the scanner 108 include the ability to transmit and receive data from a RFID tag using wireless technology. Additionally, nearly all readers contain decoder circuitry analyzing the AIDC's image data provided by the sensor and sending the AIDC's content to the scanner's 108 output port.

The I/O device 110 may include a device with a wired or wireless connection with a computing device (such as computer 112) and that is used by a person (or other system) to communicate with the computing device. The I/O device 110 may include a mobile device, a cellular phone, a smartphone, and a tablet computer. An I/O device 110 is the communication device between an information processing system (such as computer 112) and the outside world, possibly a human or another information processing system.

Computing systems and/or devices, such as the computer 112, may employ any of a number of computer operating systems, including, but not limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a mobile device, a cellular phone, a smartphone, a super-phone, a tablet computer, a next generation portable device, a computer workstation, a server, a desktop, notebook, laptop, or handheld computer, or some other computing system and/or device. Computing devices, such as the computer 112, may include computer-executable instructions such as the instructions of the tool database 116 where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Objective C, Visual Basic, Java Script, Perl, etc. A processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Tool database 116, data repositories, or other data stores described herein may include various kinds of mechanisms for storing, accessing, and retrieving various kinds of data, including a hierarchical database, a set of files in a file system, an application database in a proprietary format, a relational database management system (RDBMS), etc.

Each such data store is included within a computing device employing a computer operating system such as one of those mentioned above and are accessed via a network in any one or more of a variety of manners. A file system may be accessible from a computer operating system, and may include files stored in various formats. An RDBMS employs the Structured Query Language (SQL) in addition to a language for creating, storing, editing, and executing stored procedures, such as the PL/SQL language mentioned above.

In some examples, system elements may be implemented as computer-readable instructions (e.g., a program such as software) on one or more computing devices (e.g., servers, personal computers, etc.), stored on computer readable media associated therewith (e.g., disks, memories, etc.). A computer program product may comprise such instructions stored on computer readable media for carrying out the operations and functions described herein.

An exemplary tooling system may include a user interface device having a display, a hardware processor, memory, and a transceiver. For example, the device may be in communication with a tool scanner (e.g., as part of the device or in wired or wireless connection therewith) and a tool database (e.g., by way of a network). The device may receive (e.g., by way of the transceiver) tool information from the tool scanner and tool database, generate (e.g., by way of the processor) a comparison between the tool information from at least two of memory of the user interface, tool scanner, and tool database, store (e.g. by way of memory) the tool information and the comparison, transfer (e.g., by way of the transceiver) the tool information and the comparison to the tool scanner, tool database, or another device, and display the tool information and comparison on the interface device.

Continuing with FIG. 5, the issue report 118 contains, but is not limited to, tool information such as tool issues including a summary or list of any problems the operator 102 notices such as a high rejection rate, cracks, chips, or other physical defects visible to the operator 102, out-of-tolerance issues witnessed by the operator 102, etc. In this manner, operator 102 can both submit new data to the database 116 and retrieve and access the latest information associated with the tool 104. The issue report 118 gives both the operator 102 and a factory owner rapid access to tool information such as emerging tool parameters in near real-time, allowing both the owner and operator 102 to respond quickly to degraded or damaged tools 104 before that tool 104 is used in production. This gives an advantage in both time and money for the owner/operators.

FIG. 5 also contains an alert report 120 which may include, but is not limited to, details on the tool 104 such as tool information including replacement notifications, preventative maintenance (PM) reminders, whether the tool 104 is subject to contract/license/lien restrictions, or whether tool 104 has been the subject of special instructions or notices issued from the tool's manufacturer. The alert report 120 can be a printed report and or an electronic data message 206. Generating an alert report 120 in near real-time gives a business advantage to the owner of a factory as recall notices can be delivered quickly directly to the operator 102. Additional benefits include quickly identifying defective tools 102 and isolating said tools before they are used in production. Furthermore, tool information such as reminders for renewing liens and licenses can be quickly sent out to interested parties.

The method of reporting metrics is comprised of the following steps as shown in FIG. 5. It will be appreciated that more or fewer steps may be utilized.

Step 1. The operator 102 scans the optical/RF code device 106 on the tool 104 using a scanner 108.

Step 2. The data 114, e.g., tool information, is sent to the computer 112 where the data 114 is saved to the database 116. The computer 112 is either located in close physical association with the scanner 108 or is in electronic communication with the scanner 108 via a computer wired or wireless network or cabling system. The database stores and analyzes data 114 entered into the system; the data 114 may be, but is not limited to, tool information such as the tool's serial number or other unique identifying number associated with only that tool, the tool's date of manufacture, warranty information, authenticity of the tool, tool set-up information, lien information on the tool, contract/license information, design information, special use instructions, tool maintenance instructions, history of the tool, etc. It should be noted that this list of data fields are merely examples and it is not presented in this application as a limiting set of data fields.

Step 3. The computer 112 then retrieves pertinent data 114 from the database 116 and sends it to the scanner 108 or I/O device 110 where the data can be reviewed by the operator 102.

Step 4. The operator can also generate an issue report 118 by entering information (e.g., tool information) into the scanner 108 or I/O device 110. The issue report 118 may contain, but is not limited to, all of the information the operator 102 provides and may be augmented by additional information gathered from the database 116. The information in the issue report 118 thus may contain, but is not limited to, tool information such as the tool's serial number or other unique identifying number associated with only that tool, the tool's date of manufacture, warranty information, authenticity of the tool, tool set-up information, lien information on the tool, contract/license information, design information, special use instructions, tool maintenance instructions, history of the tool, etc. It should be noted that this list of data fields are merely examples and it is not presented in this application as a limiting set of data fields. The issue report may be sent to a pre-determined group of remote computer terminals 122 or email recipients, as desired.

Step 5. With the latest data entered into the database 116, the computer 112 can run algorithms and generate an alert report 120. The alert report 120 may contain, but is not limited to, tool information regarding the tool's 104 status, an issue description field, fields to track cost and hours spent on the issue, who reported the issue, where the issue was reported from, date and time the issue was generated, a field to attach photographs, diagrams, guidelines, files, etc., fields to record materials or parts used on the issue, an area to include steps taken to resolve the issue, a Q&A section for communicating between parties, whether the tool needs maintenance, whether an out-of-warranty condition exists, any contract/license/lien information, specific alignment parameters associated with that tool 104, instructions on how to operate and use that tool 104, whether the tool 104 needs to be taken out of service, whether the tool is subject to a recall notice, etc.

Step 6. This alert report 120 is sent back to the operator 102 and may take the form of an electronic message 206 sent to the scanner 108 or I/O device 110, an electronic message 206 to a computer, or a printout from a printer. The preferred embodiment is for the operator 102 to receive the alert report 120 on the I/O device 110 or on the scanner 108 as soon as it is generated.

Step 7. Finally, the alert report 120 may be sent to a pre-determined group of remote computer terminals 122 or email recipients, as desired.

In an alternative embodiment, the I/O device 110 shown in FIG. 5 could be an optical/RF scanner, a barcode scanner with a screen, or either of these devices with a graphical user interface. The operator 102 may enter the tool data 114 using a graphical user interface device such as a remote terminal 122 near the tool 104 location.

Figure 6:
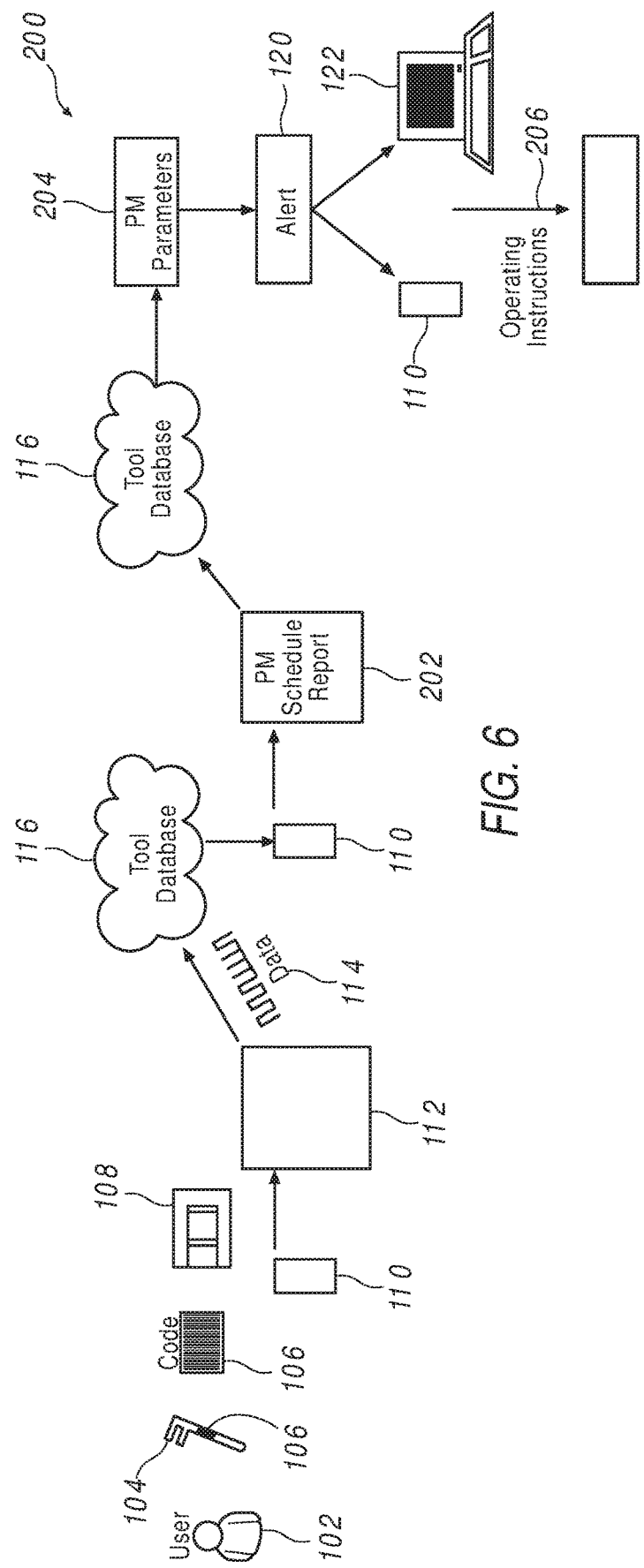
FIG. 6 illustrates a schematic diagram of a system and method of generating a Preventative Maintenance (PM) alert system.

FIG. 6 illustrates an alternative system 200 and method of generating a Preventative Maintenance (PM) Alert system 200. System 200 is similar to system 100 in that the operator 102 scans the tool 104 and enters the data 114 into the database 116, but here system 200 performs a different function with the scanned data 114 that makes its way into the database 116. System 200 performs additional functions by collecting and analyzing usage information on the tool 104. The system 200 then processes the information to see if PM is recommended and generates a PM schedule report 202. In FIG. 6, where possible, like references and numerals are used for simplicity purposes.

The system 200 is comprised of a PM schedule report 202 and alert report 120. The system 200 is used to generate a PM schedule report 202 for the tool 104 being accessed. The operator 102 begins the process by scanning the tool's 102 optical/RF code device 106 using a scanner 108 to enter the data 114 into the database 116 via the computer 112. Once the data 114 is in the database 116, it is used to augment the library of data gathered on that specific tool 104. It will be appreciated that more or fewer steps may be utilized.

PM schedule report 202 includes, but is not limited to, calendar data on when recommended maintenance for the tool 104 is due or near due, generates periodic reminders via an alert report 120 to notify personnel of upcoming deadlines for PM procedures, and can list the specific steps required of the operator 102 to perform preventative maintenance on the tool 104.

The tool database 116 may output PM parameters 204. Based on a set of pre-arranged markers, guideposts, or limit parameters, the database 116 may generate an alert report 120. The alert report 120 is sent back to the operator 102 a message 206 that provides with instructions to clean, maintain, or remove the tool for service and cleaning. Furthermore, the alert report 120 can be sent to a pre-determined group of remote computer terminals 122 or email recipients of device 110, as desired.

Figure 7:
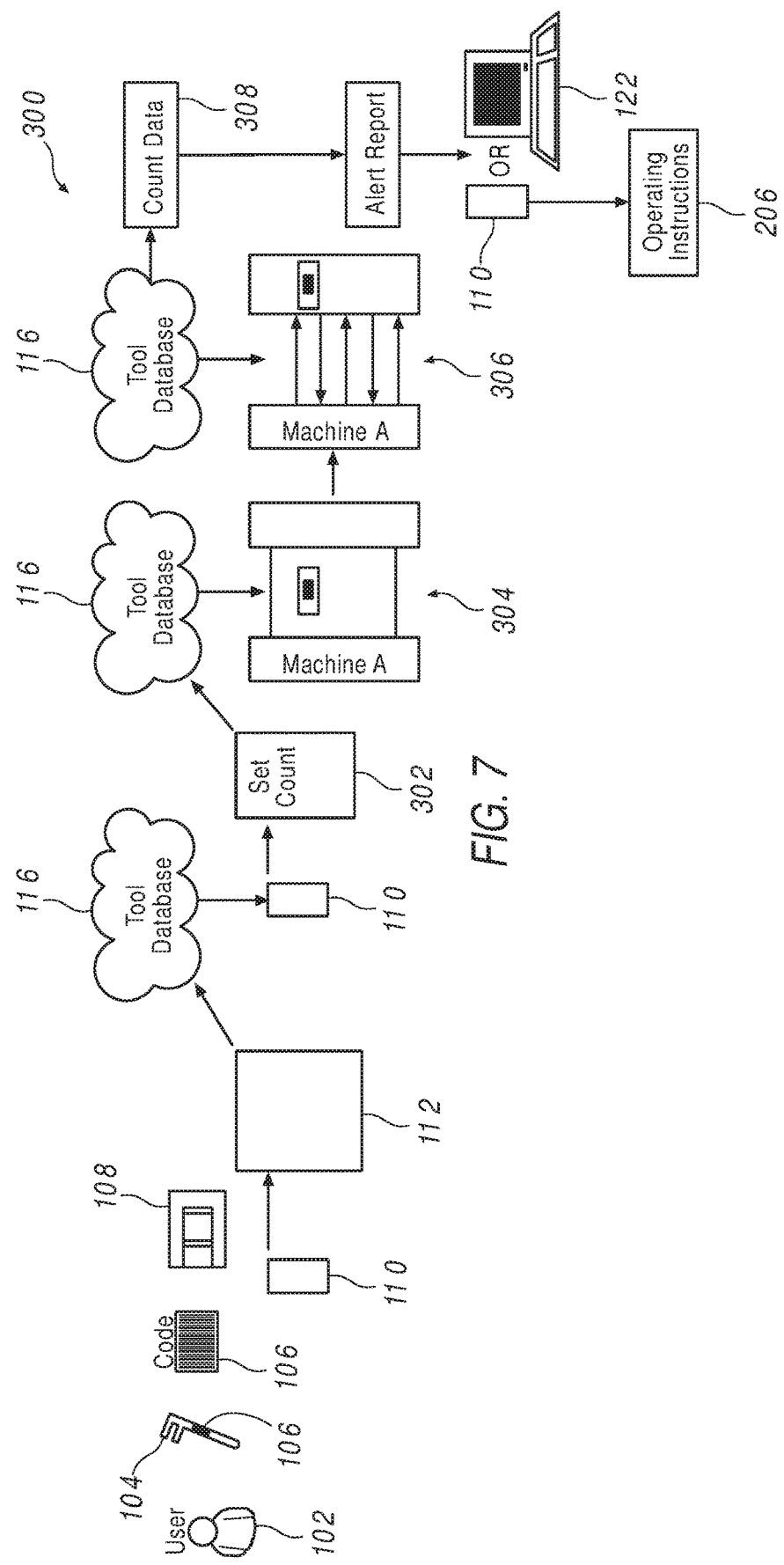
FIG. 7 illustrates a schematic diagram of a system and method of tracking the lifecycle count of a tool for use in a PM alert system.

FIG. 7 illustrates an alternative embodiment where a system 300 and method of tracking the lifecycle of a tool 104 is disclosed. System 300 is similar to system 100 in that the operator 102 scans the tool 104 and enters the data 114 into the database 116, except system 300 performs a different function with the scanned data 114 that makes its way into the database 116. System 300 performs a preventative maintenance cycle count function and retains this information as the tool 104 is moved from one machine 304 to another machine 306. The system 300 then processes the information to see if PM is recommended and generates an alert report 120. In FIG. 7, where possible, like references and numerals are used for simplicity purposes. By having the operator 102 scan the tool 104 every time it is used, a usage history is generated which assists in tracking the tool lifetime and history. By accessing the usage history of a tool 104, the owner and operator 102 of a tool 104 may track the lifetime, the PM history, any faults or alerts, and specific setup instructions for the tool 104 regardless of which machine 304, 306 is used to host the tool 104.

The PM Alert (Cycle Counter) system 300 can be performed by the user by following these steps below. In FIG. 7, where possible, like references and numerals are used. It will be appreciated that more or fewer steps may be utilized. Components of system 300 include a PM schedule report 302, a machine A 304, a machine B 306, both machines 304, 306 either located physically close to one another or physically isolated form one another, and a count data process 308.

Step 1. The tool 104 may be removed from the machine 304 and relocated to another machine 306. This feature allows each tool 104 to be in communicative association with its customized tool metrics database record regardless of the physical location of the tool 104 or of the computer 112 managing the database 116. This gives the operator 102 advantages when managing large numbers of tools 112, tools 104 used in physically different machines 304, 306 located in the same facility, and tools 104 used in machines 304, 306 located in different facilities and separated by large distances.

Step 2. The operator 102 installs the tool 104 into a new machine 306 and scans the optical/RF code device 106 using the scanner 108.

Step 3. The data 114 is sent to the database 116 which is updated and where the tool 104 metrics are retrieved. The tool 104 metrics may include, but are not limited to, tool information such as technical and business metrics such as contract information, license details, lien information, expiration data, warranty data, special instructions, recall data, or other information deemed important by the tool manufacturer or the tool user.

Step 4. The data 114 is also sent back to the scanner 108 or I/O device 110 for immediate use by the operator 102.

Step 5. The operator 102 sets metric parameters to monitor tool 104 life such as per use, per hour, per day, etc. This data 114 is sent to the database 116 for storage and analysis.

Step 6. The tool 104 is operated and or runs cycles, wherein at the end of each cycle the operator 102 scans the optical/RF code device 106 to update the database 116 again, and periodically throughout the work shift.

Step 7. The computer 112 monitors the cycle count for that specific tool 104 and once a pre-set number of cycles are reached, generates an automated alert report 120 which is sent back to the operator 102 and via email in a pre-determined list of preferred contacts.

Step 8. The PM schedule report 302 may include but is not limited to a message 206 that provides instructions to check the tool, check the parts being produced, check the fixture & gauges being used, check the "end of arm tooling", or check other secondary equipment associated with the tool or machine being used.

Figure 8:
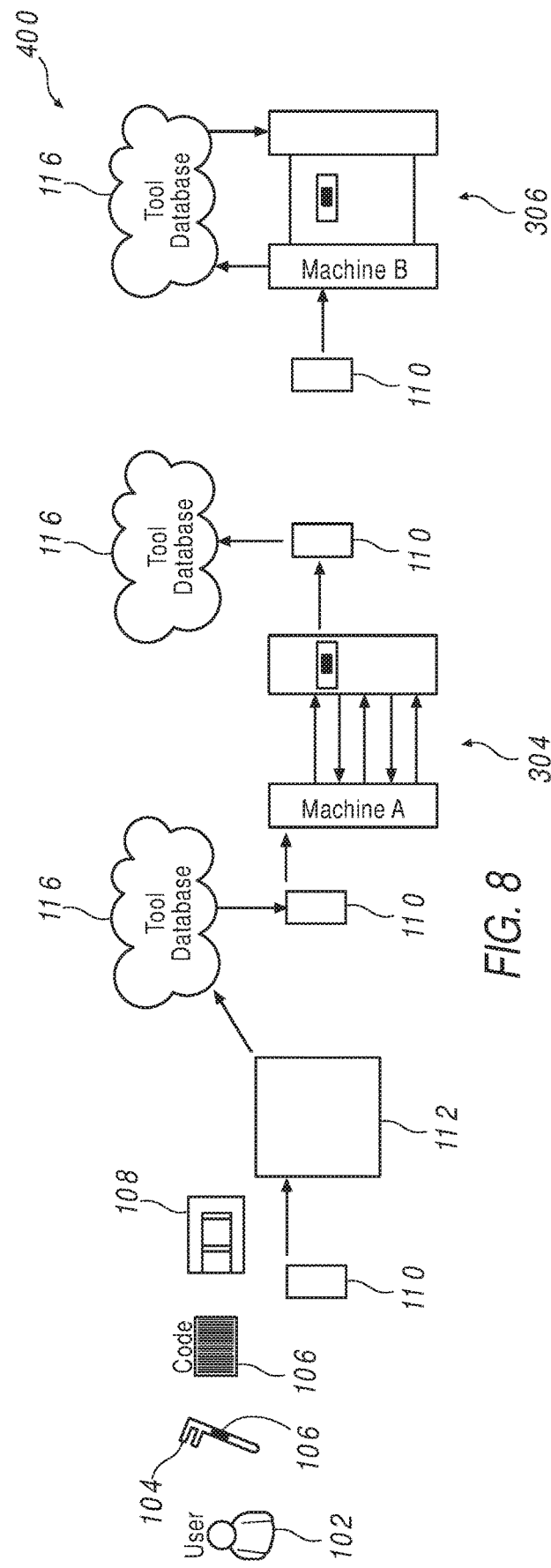
FIG. 8 illustrates a schematic diagram of a system and method of auto-populating a tool database wherein tool data gathered during a trial run is recorded. This data, including but not limited to, setup, calibration, and process data, is auto-populated into the host machine in order to attempt to match the performance the tool had during the trial.

FIG. 8 illustrates an alternative embodiment showing that system 400 differs from system 100 as shown in FIG. 5 in that the scanning is performed automatically verses having an operator 102 manually scan the tool 104. System 400 discloses a method of auto-populating the database 116. It will be appreciated that more or fewer steps may be utilized. System 400 includes machine A 304 and machine B 306, which may be machines that use tools 104 but are physically isolated from one another. In FIG. 8, where possible, like references and numerals are used for simplicity purposes.

System 400, as seen in FIG. 8, runs an "Auto-populate" process where the database 116 stores and analyzes data 114 associated with a specific tool 104. This data 114 may include, but is not limited to, tool information such as technical and business metrics such as contract information, license details, lien information, expiration data, warranty data, special instructions, recall data, or other information deemed important by the tool manufacturer or the tool user. In this manner, the operator 102 has ready the very latest usage, operation, ownership, and safety data on that tool 104 every time the tool 104 is used.

The details of how system 400 may operate could include the following process. The tool 104 is automatically scanned by the host machine 304 where the machine 304 is in electronic communication with the computer 112 and database 116. Every time the tool 104 is used, inserted, or removed, that data 114 is forwarded for analysis. When analyzed with other individual tool metrics collected over time, the tool manufacturer can run statistical quality control analysis or "Six Sigma" analysis for the entire tool production run. In this manner, the tool manufacturer can monitor customer preferences, estimate tool family life, see trends in tool 104 usage, detect possible quality control issues, and other valuable business details. This analysis can help estimate present and future business needs as well as detect quality problems quickly and without needlessly contacting the customer for periodic updates.

As seen in FIG. 8, a further embodiment can be envisioned where the data 114 collected by the system 400 may be used by the tool manufacturer for business purposes. This data 114, collected from the individual tool operators 102, is collected and analyzed by the tool manufacturer to garner metrics on the entire tool family, defined as the total production of individual tools 104 in use throughout the industry. The tool manufacturer can monitor when a tool 104 is first used, tool usage, tool 104 replacement rates, and tool 104 lifetime rates.

Figure 9:
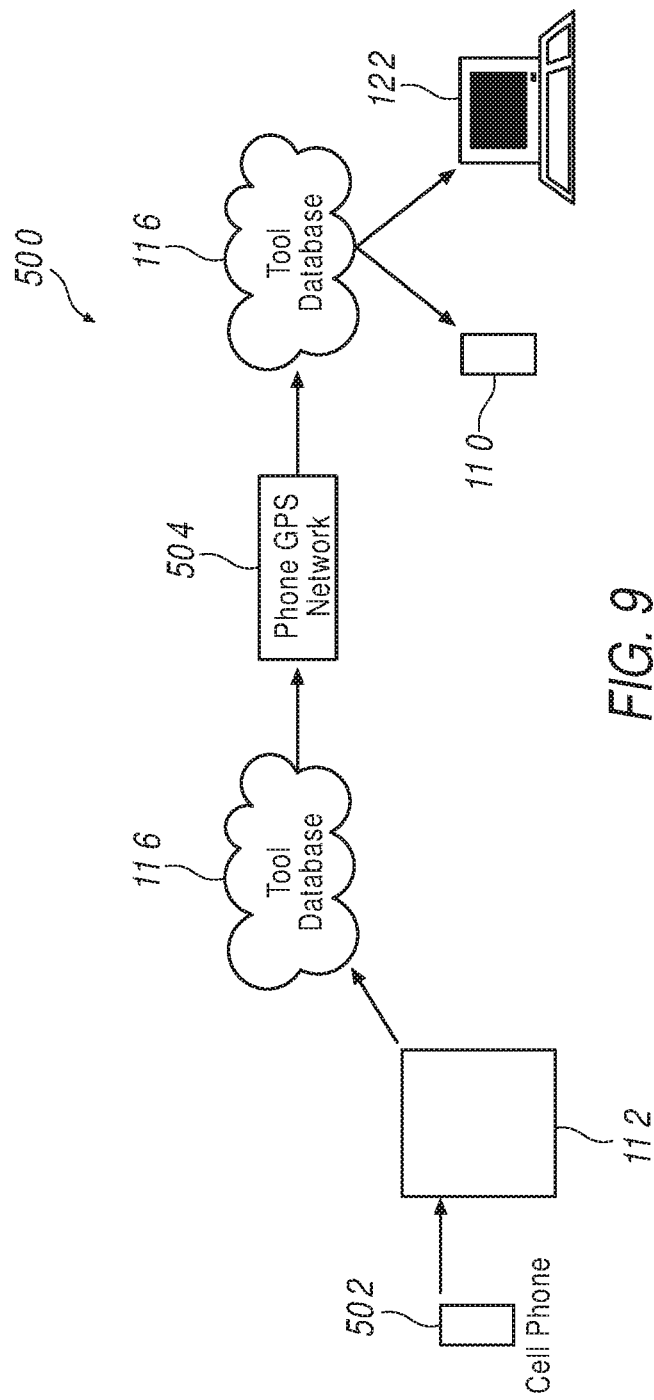
FIG. 9 illustrates a schematic diagram of a system and method of tracking tools and updating a database using a global positioning system (GPS) as part of a cellular phone or using cellular triangulation by way of a cellular network.

As seen in FIG. 9, a further embodiment can be envisioned where system 500 is similar to system 100 in that the operator 102 scans a tool 104 and enters the data 114 into a database 116. System 500 contains, but is not limited to, a GPS- and camera-enabled cellular phone 502 and utilizes a GPS-enabled cellular phone cellular network 504. A tool location may be generated from a GPS as part of the cellular phone 502 or from cellular triangulation by way of cellular network 504. In FIG. 9, where possible, like references and numerals are used for simplicity purposes.

However, in this embodiment, the differences from system 100 as shown in FIG. 5 and system 500 shown in FIG. 9, the scanning device is a cellular phone with GPS and camera capability 502 that has the ability to take a photograph or scan the tool 104 and enter the data 114 into the database 116. This embodiment gives the owner/operator 102 the advantages of using a small portable scanner in the form of the cellular phone 502. An additional advantage is this embodiment gives the tool owner/operator 102 the ability to record and track the tool's 104 location every time the tool is scanned. In this manner, a permanent record of the tool's whereabouts are made and stored in the database 116.

Figure 10:
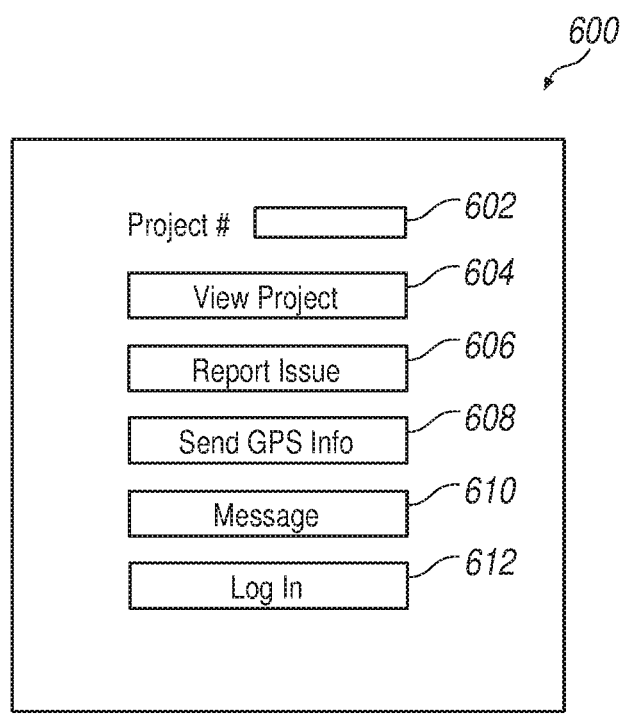
FIG. 10 illustrates another user interface of a tooling system, e.g., for automated access, reporting, and distribution of tool information and issues.

FIG. 10 illustrates tooling system 600 including a user interface of a device, e.g., for accessing, reporting, and distributing tool information including tool issues. System 600 may include boxes, windows, areas, or buttons that are concurrently or sequentially displayed for inputting, displaying, and/or accessing one or more of project identification number 602, view project 604, report issue 606, send GPS information 608, message 610, and log in 612. Project identification number 602 may be configured to receive tool information such as a project identification number regarding a tool. View project 604 may be configured to display tool information. Report issue 606 may be configured to receive tool issues regarding the tool. Send GPS information 608 may be configured to send a tool location based on a GPS. Message 610 may be configured to send a message including tool information. Log in 612 may be configured to log in a user for inputting and viewing tool information.

Figure 11:
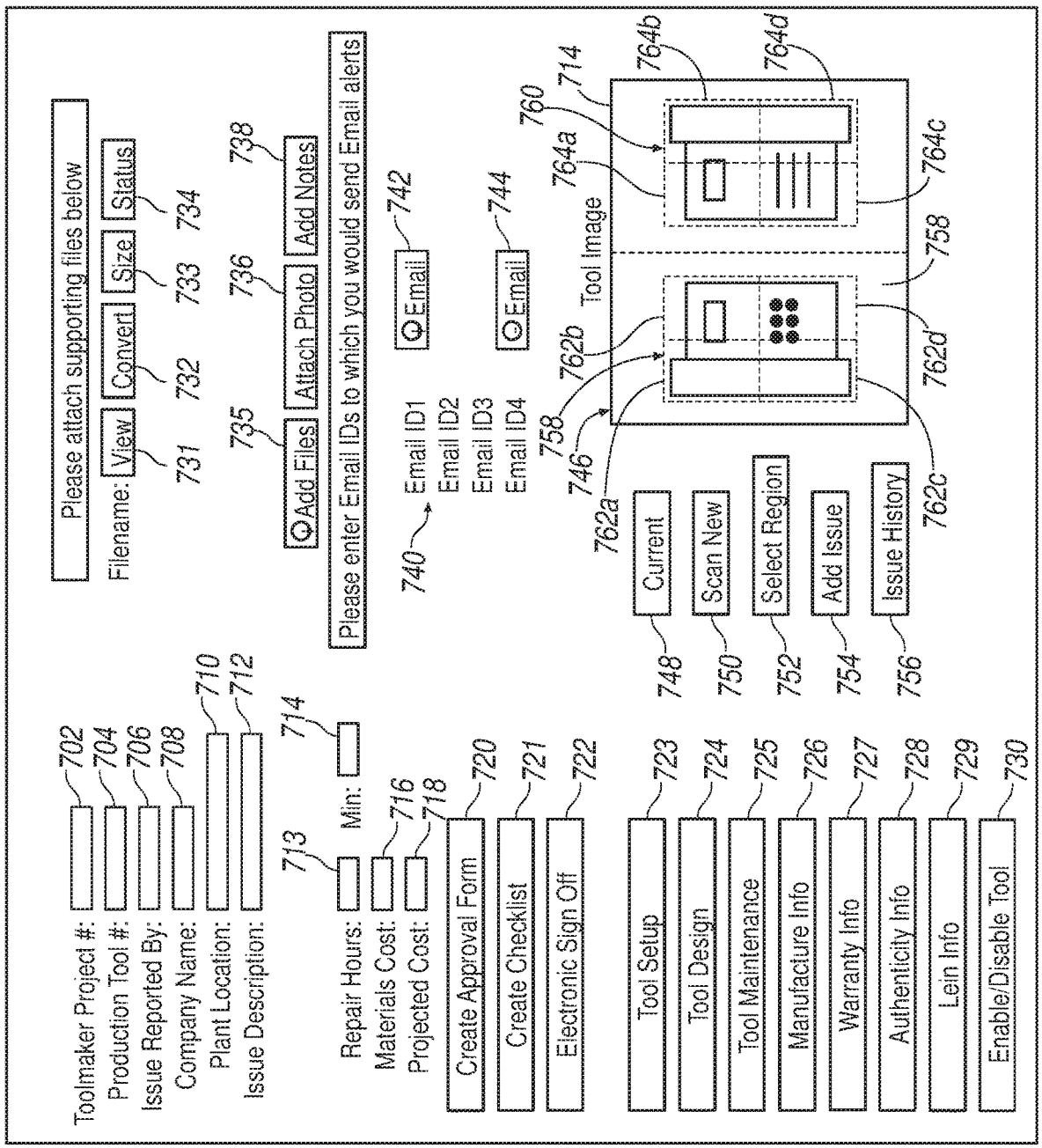
FIG. 11 illustrates another user interface of a tooling system, e.g., for automated displaying and reporting of tool information and issues.

FIG. 11 illustrates tooling system 700 including a user interface of a device, e.g., for e.g., for displaying and reporting tool information including tool issues. The user interface of the system 700, in a first display area, may concurrently or sequentially display boxes, windows, areas, or buttons for inputting, displaying, and/or accessing tool information including one or more of toolmaker project number 702 for a project associated with a tool, production tool number 704 with a tool number of the tool, issue reported by 706 with a name of the person reporting the tool issue, company name 708 with the company associated with the person reporting the tool issue, plant location 710 including a tool location by an area, room, or floor of a facility, and issue description 712 with details of the tool issue, In the same or a second display area, the user interface of the system 700 may concurrently or sequentially display boxes, windows, areas, or buttons for inputting, displaying, and/or accessing tool information including one or more of repair hours 713 with an estimated or incurred number of hours to repair the tool issue, minimum 713 with a minimum, estimated, or incurred services cost for the tool issue, materials cost 716 with an estimated or incurred cost for the tool issue, projected cost 718 with the total or projected costs of the tool issue, create approval form 720 to create a customer approval form or checklist for approving repair of the tool issue, create or view checklist 721 for itemizing phases or components of repairing the tool, and electronic sign off 722 for authorizing repair of the tool.

Furthermore, in the same or a third display area, the user interface of the system 700 may concurrently or sequentially display boxes, windows, areas, or buttons for inputting, displaying, and/or accessing tool information including one or more of tool setup 723 including tool setup information and instructions, tool design 724 including tool design information and instructions, tool maintenance 725 including tool maintenance information and instructions, manufacture info 726 including manufacture date, manufacture location, and manufacturer name, warranty info 727 including warranty status, warranty details, total warranty term, and remaining warranty term, authenticity info 728 including authentication information for the tool, lien information 729 including any lien placement, lean release, loan, ownership, and payment information, histories, or terms for the tool, e.g., from a Uniform Commercial Code (UCC) database, and enable/disable tool 730 allowing the user to selectively enable and disable the tool in response to any tool information, e.g., failure to pay for the tool according to payment terms.

The user interface of the system 700, in the same or a forth display area or section, may also concurrently or sequentially display boxes, windows, areas, or buttons for inputting, displaying, and/or accessing tool information including one or more of view 731 to view tool information and images, convert 732 to convert the file format of the tool information and images to another file format selected by the user, size 733 including the file size of the tool information and images, status 734 including a file conversion status, add files 735 including any electronic or scanned documents related to the tool, attach photo 736 including an image of the tool, and add notes 738 including any notes and comments regarding the tool issue near or directly on the tool image.

In the same or a fifth display area or section, the user interface of the system 700 may further concurrently or sequentially display boxes, windows, areas, or buttons for inputting, displaying, and/or accessing tool information including one or more of contract list 740 including predefined contacts and email addresses, add email 742 to add predefined contacts and email addresses, and remove email 744 to remove predefined contacts and email addresses.

In addition, the user interface of the system 700, in the same or a sixth display area, may further concurrently or sequentially display boxes, windows, areas, or buttons for inputting, displaying, and/or accessing tool information including one or more of tool image 746 of the tool, current 748 to display the latest or a current scan or image of the exterior and interior surfaces of the tool, scan new 750 to capture or import a new scan or image of the tool, add issue 754 to associate tool issues with the tool image or scan associated with one or more tool issues, and issue history 756 to display or access a listing of tool issues. Add issue 754 may be configured to select one or both of the first and second sides 758, 760 of the tool, e.g., the cavity and core sides of a mold. Tool image 746 may include sections 762a, 762b, 762c, 762d of the first side 758 and sections 764a, 764b, 764c, 764d of the second side 760, e.g., for making a tool area selection with respect to the tool issue image and association with one or more tool issues.

System 700 may include a tooling system. System 700 may include a tool scanner 108 configured to read or scan a tool 15, a tool database 116 having tool information associated with a tool identifier 12, and a user interface device 35 in communication with the tool scanner 108 and the tool database 116. The user interface device 35 may receive tool information from the tool database 116 in response to the scan by the tool scanner 108, concurrently display a tool issue description 712 and a tool issue image 746 from the tool information of the tool database 116, receive a tool area selection 762, 764 with respect to the tool issue image 746, and provide access to a tool issue history from the tool database 116 in response to the tool area selection 762, 764. The user interface device 35 may further concurrently display at least one, two or three types of data 114 including tool information such as tool set-up information, design information, maintenance instructions, tool condition, manufacture date, warranty information, and authenticity information from the tool information of the tool database. The user interface device may further concurrently display additional data 114 such as a tool location from at least one of a global positioning system (GPS) and cellular triangulation. The user interface device may further send data 114 such as tool information to a predetermined list of contacts associated with the tool 15.

Methods of using the system 700 are also contemplated. A method may include receiving data 114 such as tool information from the tool database 116 in response to the scan by the tool scanner 108. A method may further include concurrently displaying a tool issue description 712 and a tool image 746 (e.g., with a tool issue) from the data 114 including tool information of the tool database 116. A method may also include receiving a tool area selection 762, 764 for the tool issue with respect to the tool image 746. A method may additionally include providing access to data 114 such as tool information (e.g., a tool issue history) from the tool database 116 in response to the tool area selection 762, 764.

Figure 12:
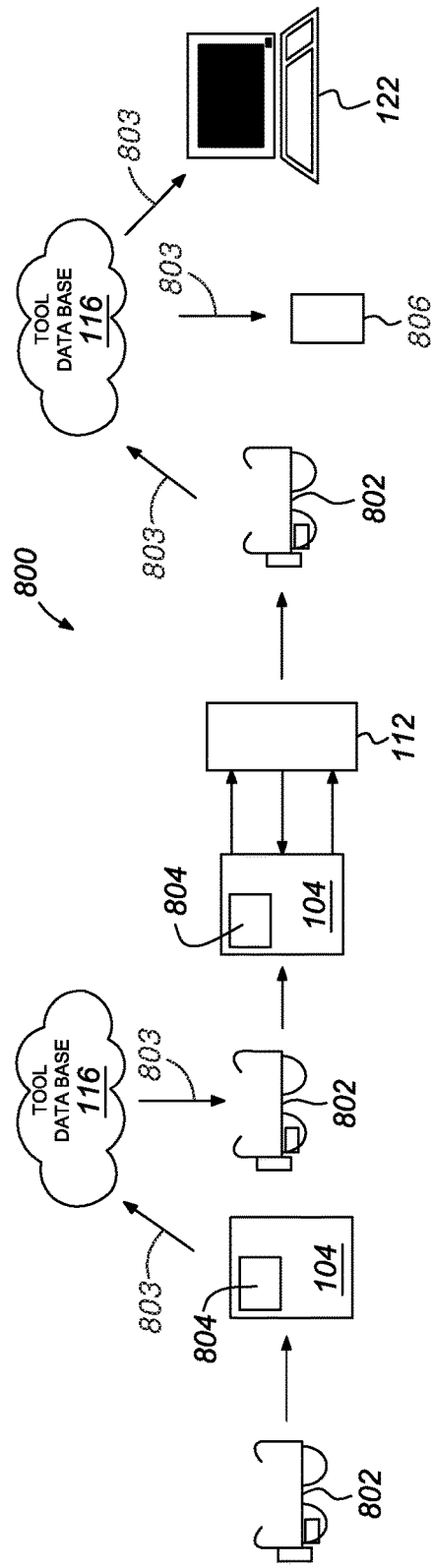
FIG. 12 illustrates an alternative tooling system including, for example, a smart device.

FIG. 12 illustrates tooling system 800. System 800 may include smart device 802, machine tool 104, tag 804, tool database 116, computer 112, mobile device 806 (e.g., I/O device, scanner, and/or cellular device), and remote terminal 122, which may receive, store, and transfer tool information 103. Smart device 802 may be configured a protective eyewear. Smart device 802 may include any electronic device configured to interactively or autonomously communicatively connect with any of the other devices herein by way of any communications network or protocol such as Bluetooth, NFC, Wi-Fi, or cellular. Smart device 802 may be configured to scan tag 804 to receive tool information 803.

Tag 804 may include a transmitter such as a Near Field Communication (NFC) transmitter. Alternatively, tag 804 may include a quick response (QR) code or a barcode as disclosed herein. Tag 804 may be permanently or releasably affixed to machine tool 104. Tag 804 may include, store, and transfer tool information 803.

Any component of system 800 may receive, store, and send tool information 803 to any other component of the system 800. Smart device 802 and mobile device 806 may include memory with a program, a hardware processor (e.g., processor 30) configured to execute the program, and a display (e.g., display 35). As shown in FIG. 12, smart device 802 and mobile device 806 may scan tag 804 on machine tool 104. Smart device 802 and mobile device 806 may receive tool information 803 from tool database 116 (e.g., cloud database). Smart device 802 and mobile device 806 may store tool information 803, display tool information 803, record tool information 803 in action (e.g., during tool production), take videos and/or pictures of the tool to log and share by way of the program, and report and log maintenance activity, and report and log production activity. The smart device 802 and mobile device 806 may store the tool information 803 and send the tool information 803 to database 116. The tool information 803 may be shared and transferred to other uses by way of mobile device 806 and remote terminal 122.

Figure 13:
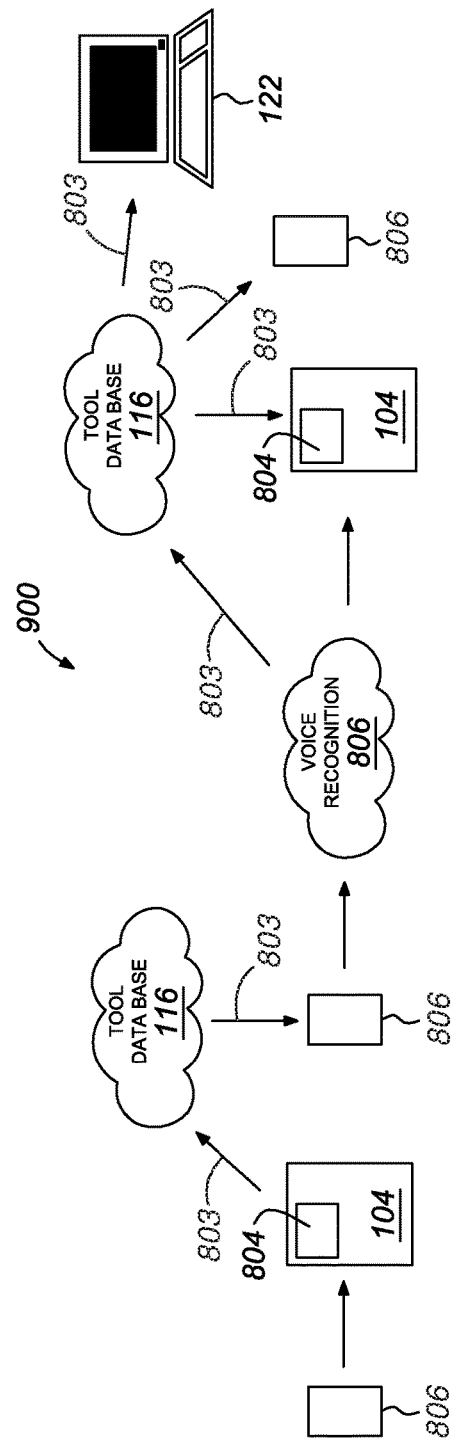
FIG. 13 illustrates an alternative tooling system including, for example, a voice recognition device.

FIG. 13 illustrates an alternative tooling system 900. System 900 may include mobile device 806, machine tool 104 with tag 804, tool database 116, voice recognition device 808, and computer device 122, which may receive, store, and transfer tool information 803. System 900 may utilize voice recognition technology. Mobile device 806 may scan tag 804 to activate a project and retrieve information from tool database 116 associated with the project. After user access is confirmed and approved by a server of database tool 116, a user may access tool information 803 from tool database 116 by way of mobile device 806. Mobile device 806 may include a voice recognition device 808 and/or a program with voice recognition technology. Mobile device 806 may be configured to record and log maintenance information, input production totals and status, record notes or a message to track with tool 104 and make available to other users and send alerts and notifications. Mobile device 806 may be configured to communicate tool with database 116 and other users and devices. The tool information 803 may then be logged, stored, tracked, and shared with other users and devices.

Figure 14:
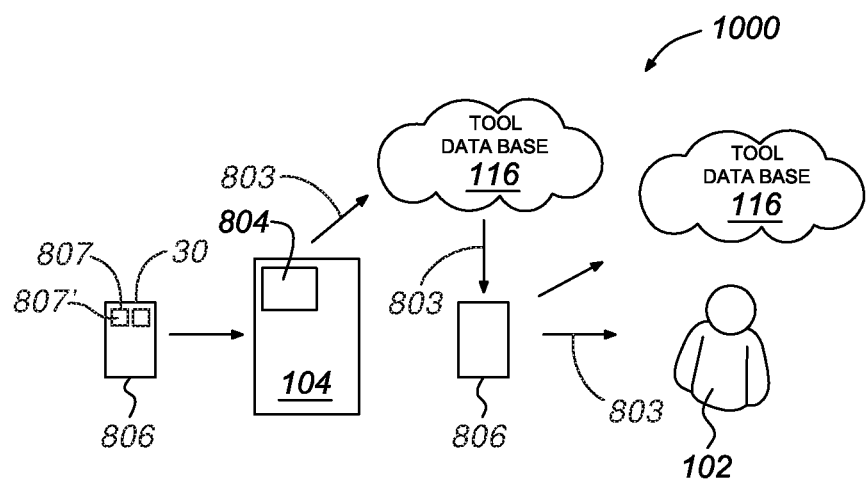
FIG. 14 illustrates an alternative tooling system including, for example, a spare parts inventory.

FIG. 14 illustrates tooling system 1000. System 1000 may include machine tool 104, mobile device 806, and tool database 116, which may receive, store, and transfer tool information 803. Mobile device 806 may include memory 807 that stores instructions of program 807' and a processor executes the instructions of program 807' to provide the operations herein. The tool information 803 may further include a spare parts inventory. Mobile device 806 may scan a tag 804 of machine tool 104 and receive tool information 803 from tool database 116. The tool information 803 may be sent to mobile device 806. The mobile device 806 may access tool information 803 including the spare parts inventory for a particular project or tool. The mobile device 806 may update tool information 803 in database 116 directly or from the separate mobile device. The mobile device 806 may be configured to provide real-time notifications a vendor device to order new parts in response to tool information 803 such as an inventory indication (e.g., indicating low inventory for the particular project or tool) by way of the program 807'. The user 102 can utilize this process and system to aid in tool management.

Figure 15:
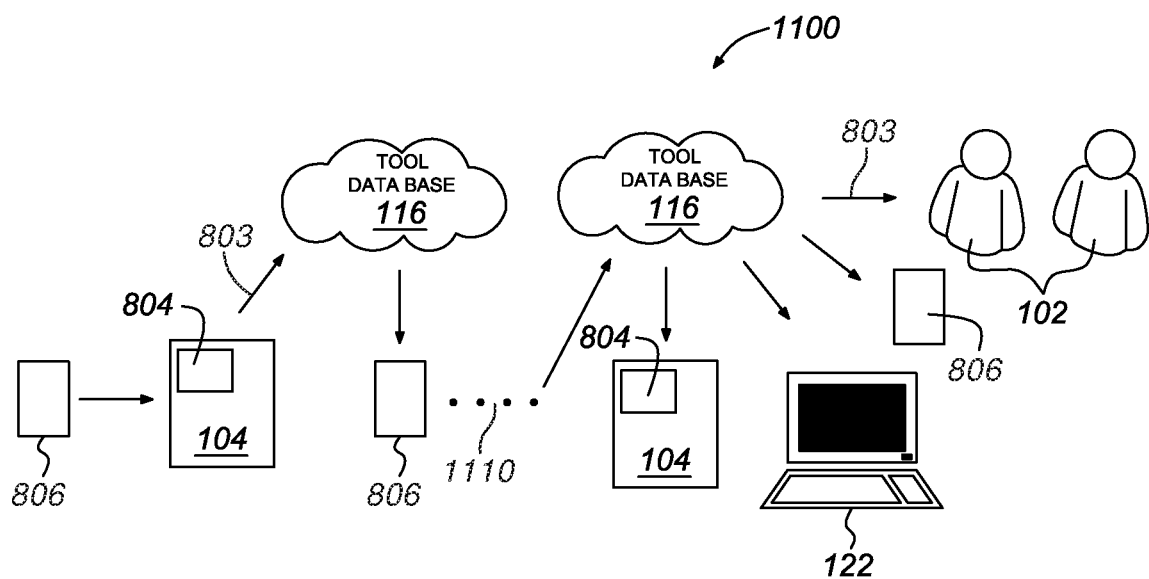
FIG. 15 illustrates an alternative tooling system including, for example, a messaging service.

FIG. 15 illustrates tooling system 1100. System 1100 may include mobile device 806, machine tool 104 with tag 804, tool database 116, and remote terminal 122, which may receive, store, and transfer tool information 803. Mobile device 806 may scan tag 804 and retrieve tool information 803 from tool database 116. The tool information 803 may be sent to the mobile device 806. The mobile device 806 may include a program with a messaging service to transfer electronic messages 1110 (e.g., instant, short message service (SMS), chat, or e-mail message) to other devices and users. The mobile device 806 may send messages 1110 to the tool database 116. The messages 1110 may include tool information 803. The messages 1110 may be logged in the tool history as part of the tool information 803. The messages 1110 may be tracked with the machine tool 104. The messages 1110 may be sent directly to other devices and users for real-time communication regarding the machine tool 104.

Figure 16:
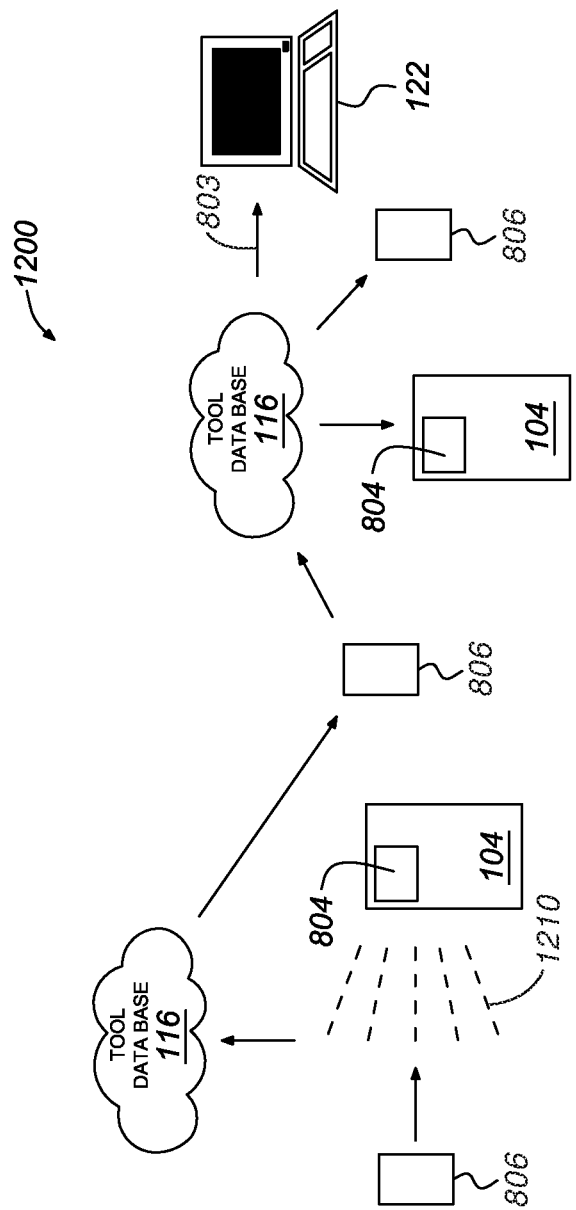
FIG. 16 illustrates an alternative tooling system including, for example, Near Field Communication (NFC) technology.

FIG. 16 illustrates tooling system 1200. System 1200 may utilize Near Field Communication (NFC) technology. System 1200 may include mobile device 806, tool database 116, machine tool 104 with tag 804, and remote terminal 122, which may receive, store, and transfer tool information 803. Mobile device 806 may access tool information 803 for a specific machine tool 104 according to user permissions by being within a predefined proximity 1210 of the machine tool 104. As such, communication between the machine tool 104, tool database 116, and mobile device 806 may be activated by being within the predefined proximity and without a user-initiated scan of tag 804. The mobile device 806 may automatically obtain a real-time connection with the machine tool 104 through a predefined frequency in response to the mobile device 806 and machine tool 104 or tag 804 being within a predefined distance. The mobile device 806 may display the tool information 803, log maintenance and production activity, send alerts and notifications, record and store tool information 803, communicate with other devices and users, update tool production timelines, and/or track tool location information.

Figure 17:
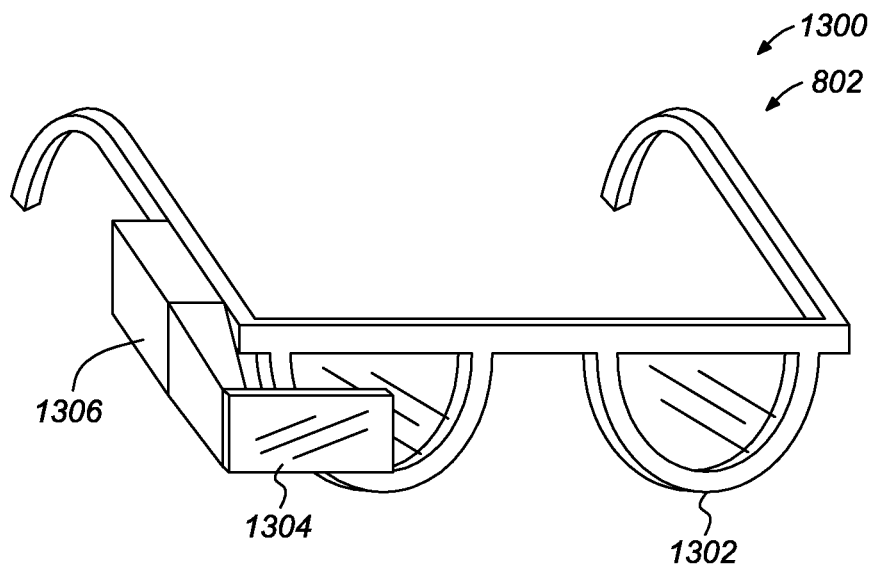
FIG. 17 illustrates an exemplary smart device of the present disclosure.

As shown in FIG. 17, system 1200 may include smart device 802 as discussed herein. Smart device 802 may include protective eyewear 1302 permanently or releasably attached to computing device 1306 having display 1304. The computing device 1306 may contain memory with a program and a processor configured to execute the program. The device 802 may be interchangeable with the other devices herein (e.g., mobile device 806) or may be used in addition thereto. The device 802 may be utilized with and may be operable to engage the other systems herein, e.g., system 800 as discussed above with respect to FIG. 12.

Figure 18:
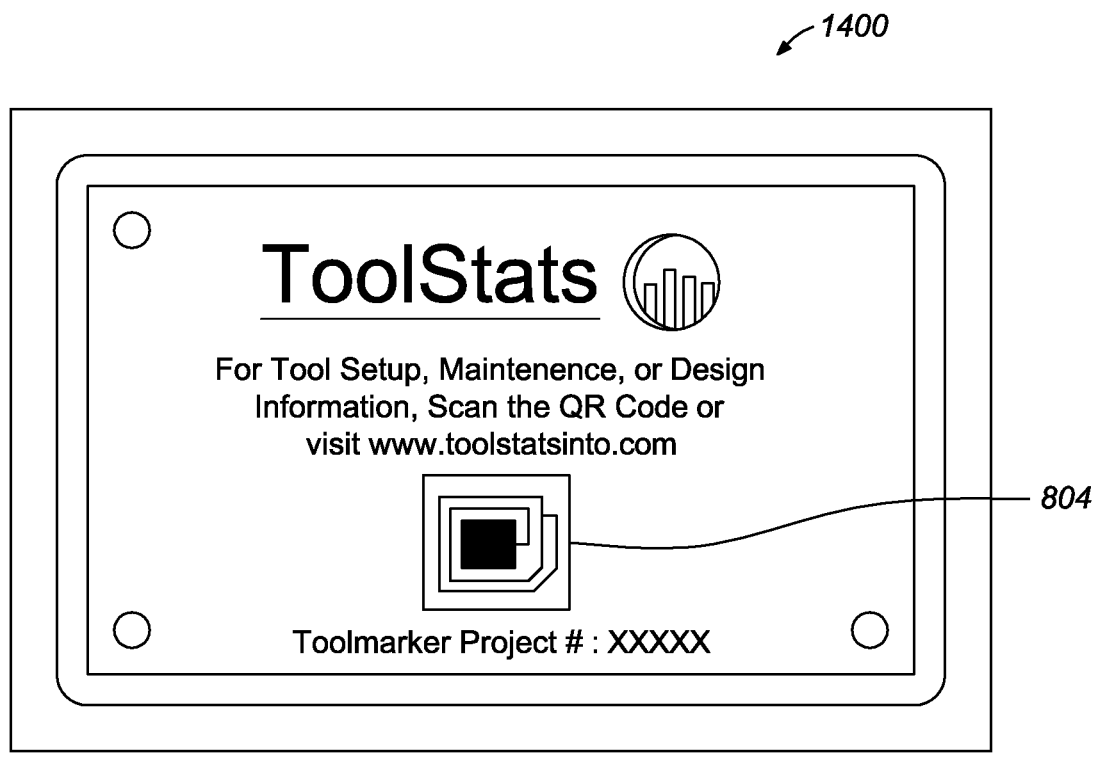
FIG. 18 illustrates an exemplary tag of the present disclosure.

FIG. 18 illustrates system 1400. System 1400 may include tag 804, e.g., a Near Field Communication (NFC) tag. Tag 804 may be permanently or releasably attached to tool database 116. The tag 804 may automatically send and transmit tool information 803 to mobile device 806 or smart device 802.

Figure 19:
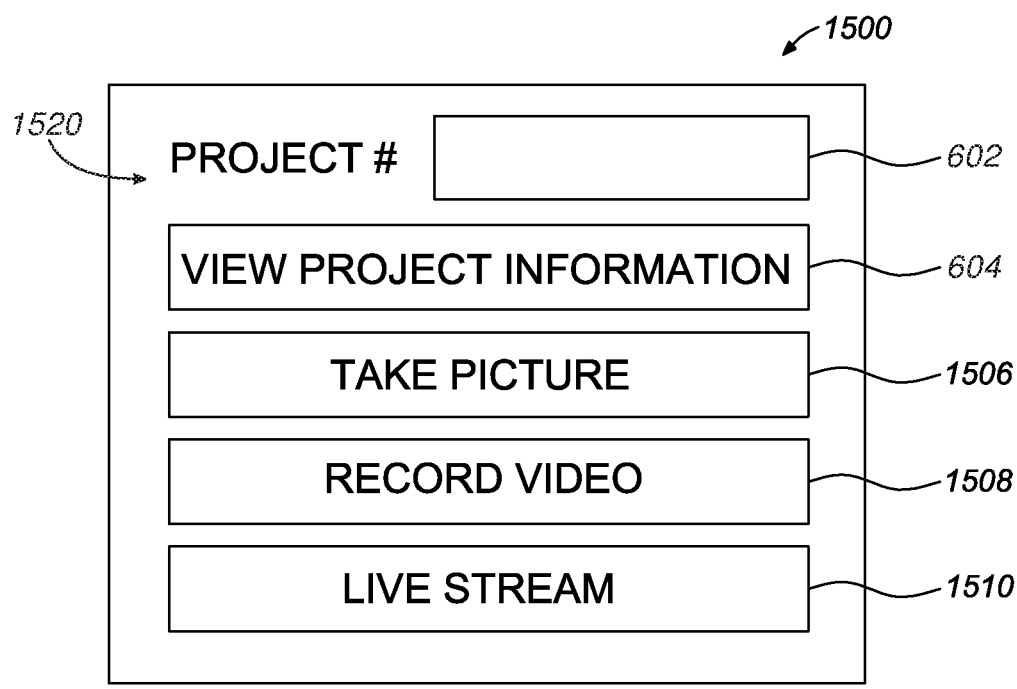
FIG. 19 illustrates an exemplary user interface of the present disclosure.
Figure 20:
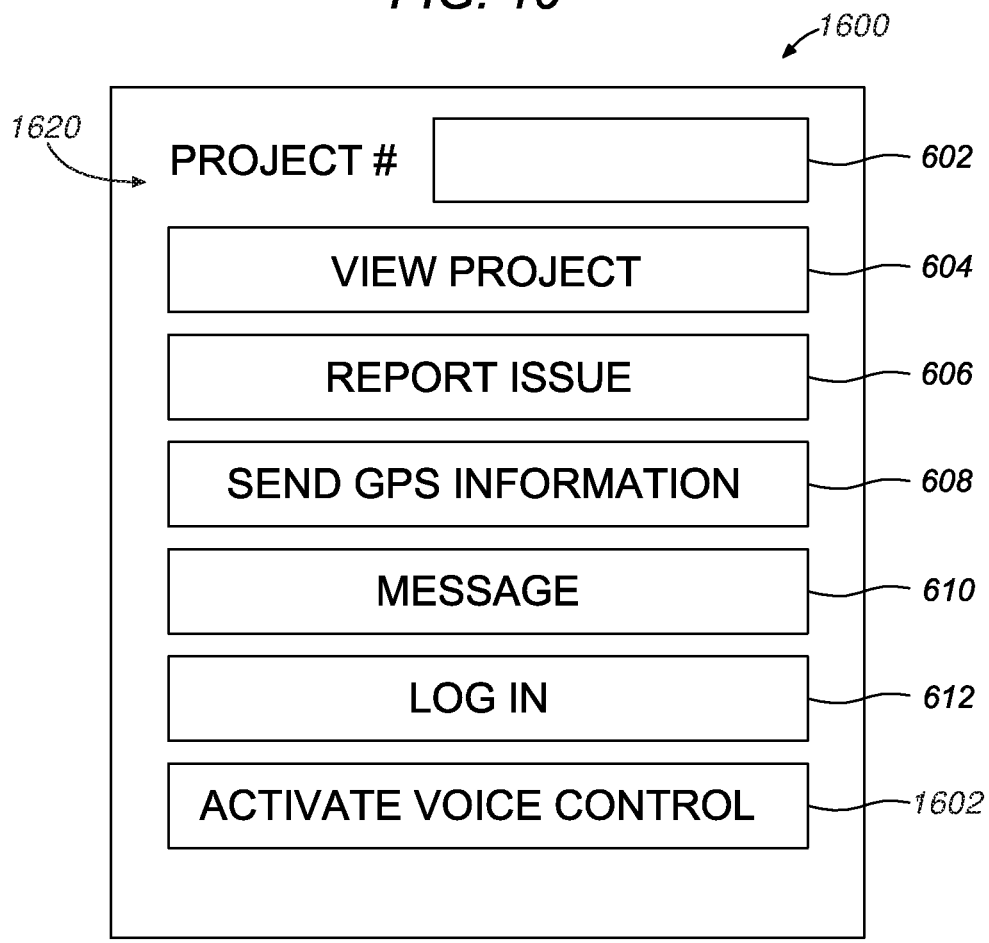
FIG. 20 illustrates am exemplary user interface of the present disclosure.

FIGS. 19-20 illustrate tooling systems 1500 and 1600 including a user interface screen 1520 or 1620 may be displayed on mobile device 806, e.g., for accessing, reporting, and distributing tool information 803. Systems 1500 and 1600 may include boxes, windows, areas, or buttons that are concurrently or sequentially displayed for inputting, displaying, and/or accessing information including, for example, one or more of project identification number 602, view project 604, record video 1508, live stream 1510, report issue 606, send GPS information 608, message 610, and activate voice control 1602.

Figure 21:
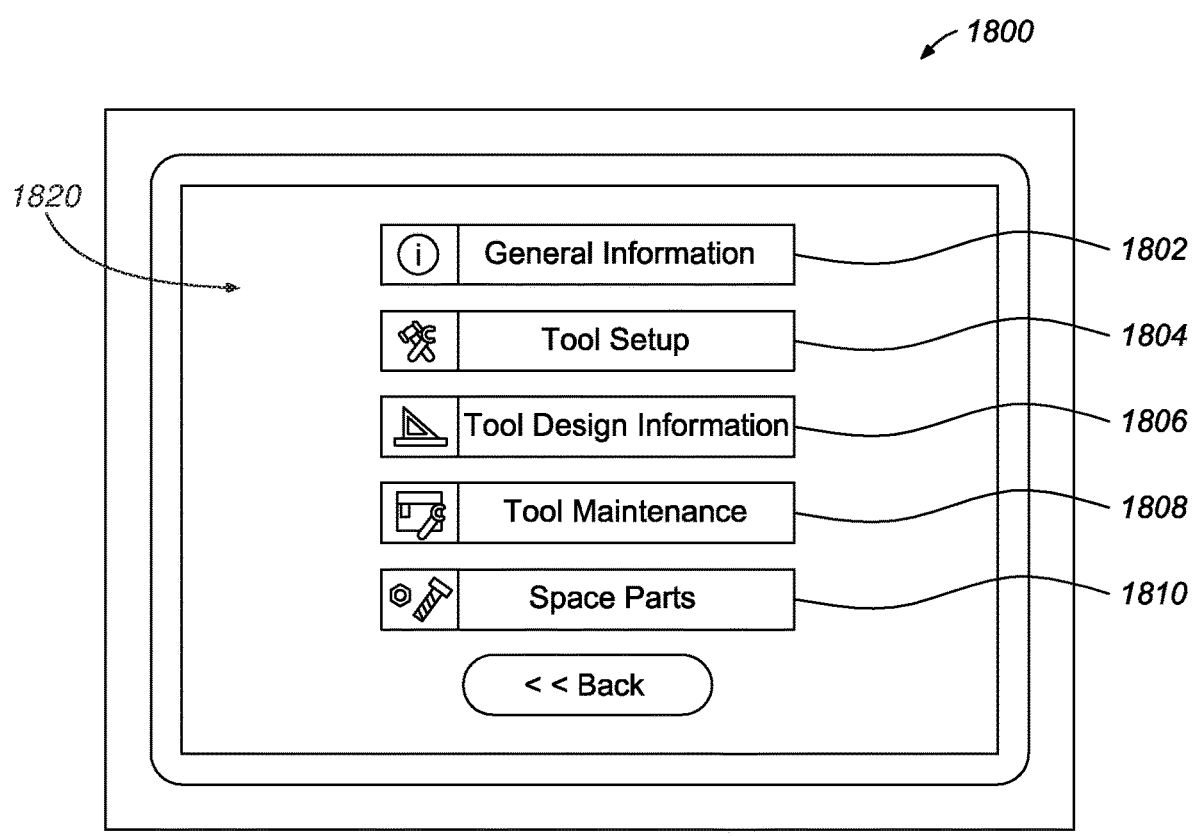
FIG. 21 illustrates another exemplary user interface of FIG. 4C including, for example, spare parts information.

FIG. 21 illustrates tooling system 1800 including a user interface screen 1820 may be displayed on mobile device 806, e.g., for accessing, reporting, and distributing tool information 803. System 1800 may include boxes, windows, areas, or buttons that are concurrently or sequentially displayed for inputting, displaying, and/or accessing tool information 803 including, for example, one or more of general information 1802 (e.g., regarding a project), tool setup information 1806, tool maintenance information 1808, and spare parts information 1810.

Figure 22:
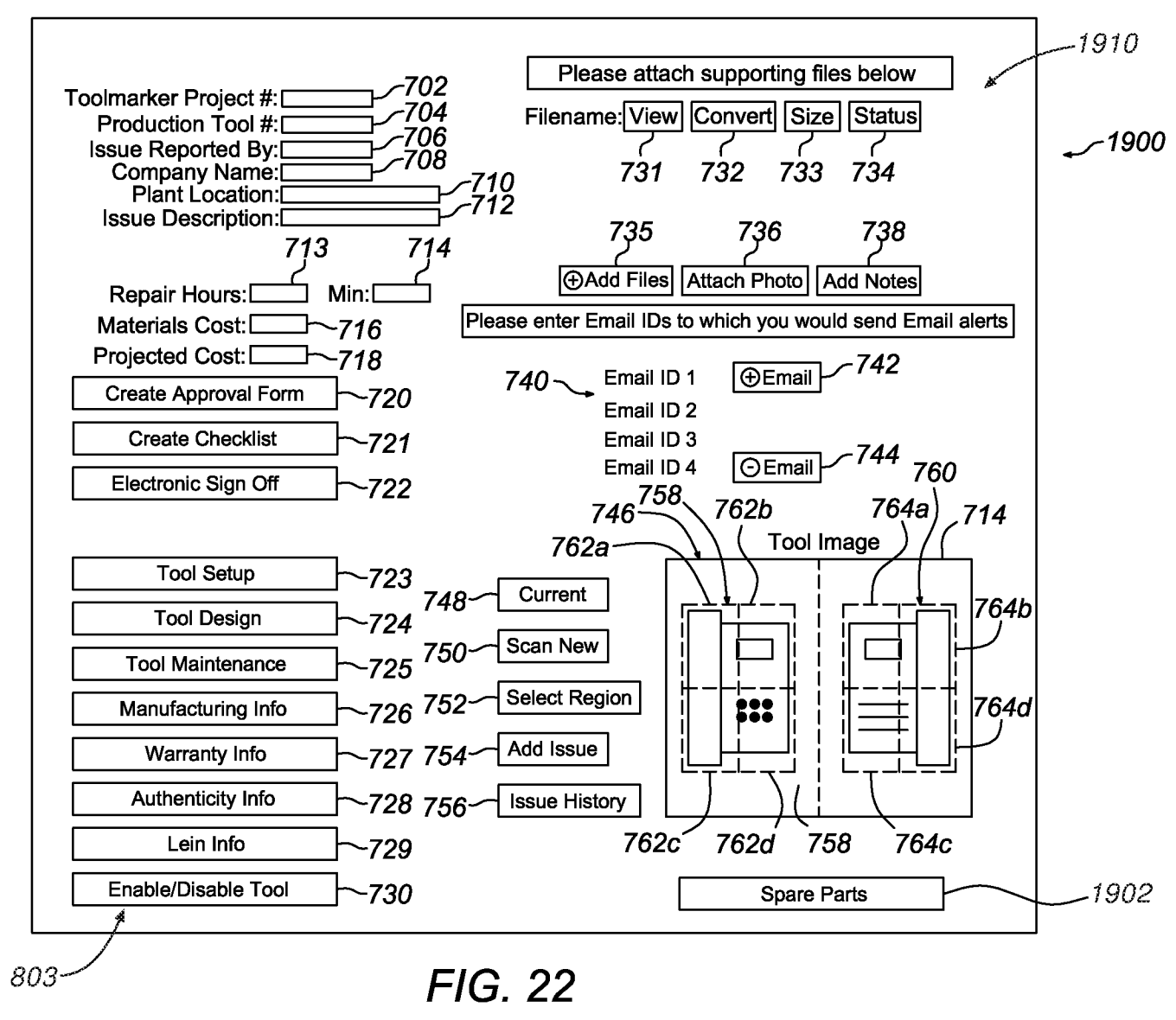

FIG. 22 illustrates tooling system 1900 including a user interface screen 1910 may be displayed on mobile device 806, e.g., for e.g., for displaying and reporting tool information 803. System 1900 may include any or all the components of system 700 as described with respect to FIG. 11. Alternatively, or in addition, the user interface of the system 1900 may concurrently or sequentially display boxes, windows, areas, or buttons for inputting, displaying, and/or accessing tool information 803 including, for example, spare parts information 1902.

FIG. 23 illustrates tooling system 2000 including a user interface screen 2010 may be displayed on mobile device 806, e.g., for e.g., for displaying and reporting tool information 803. The user interface screen 2010 of the system 2000 may concurrently or sequentially display boxes, windows, areas, or buttons for inputting, displaying, and/or accessing tool information 803 including, for example, parts list information 2002, sample part view 2003, stock count information 2004, counted by information 2006, dated counted information 2008, annual usage information 2010, last price information 2012, vendor information 2014, order information 2016, and order view 2018.

FIG. 24 illustrates tooling system 2100 including a user interface screen 2101 may be displayed on mobile device 806, e.g., for e.g., for displaying and reporting tool information 803. The user interface screen 2101 of the system 2100 may concurrently or sequentially display boxes, windows, areas, or buttons for inputting, displaying, and/or accessing tool information 803 including, for example, company information 2102, project information 2104, production information 2106, maintenance information 2108, 2110 spare parts information 2110, file information 2112, timeline information 2114, GPS information 2116, my projects 2118, project search 2120, project number, part number, part name, and program information 2121, and/or tool images, descriptions, and details 2122.

It should be understood, of course, that the foregoing relates to exemplary embodiments of the disclosure and that modifications may be made without departing from the spirit and scope of the disclosure as set forth in the following claims. By way of example, modifications considered include setting up for maintenance intervals creating alarms to wireless devices announcing time for tool maintenance, changes, or tear down reviews. It should also be understood that ranges of values set forth inherently include those values, as well as all increments between.

What is claimed is:

1. A tooling system, comprising:
a tag associated with a tool, the tool is one of a die, a mold, or an injection molding device, the tool is configured to form material during an operation;
a tool database having tool information that is stored in the cloud, the tool information including a predefined proximity associated with the tag, tool design, and an image of the tool; and
a communication device configured to:
automatically activate, without a user-initiated scan, communication with at least one of the tool and the tool database in response to the tag of the tool being within the predefined proximity; and
transfer tool information of the tool with respect to the tool database.

2. The system of claim 1, wherein the tool information includes a log of at least one of maintenance activity and production activity associated with the tool.

3. The system of claim 1, the communication device further configured to automatically initiate at least one of an alert and a notification associated with the tool.

4. The system of claim 1, wherein the tool information further includes at least two of tool set-up information, design information, maintenance instructions, tool condition, manufacture date, warranty information, and authenticity information.

5. The system of claim 1, wherein the tag associated with the predefined proximity includes a quick response (QR) code and radiofrequency identification (RFID).

6. The system of claim 1, the communication device is further configured to:
concurrently display boxes, windows, areas, or buttons associated with the tool set-up information, design information, maintenance instructions, tool condition, manufacture date, warranty information, and authenticity information from the tool information of the tool database.

7. The system of claim 1, wherein the communication device is further configured to display a tool location from at least one of a global positioning system (GPS) and cellular triangulation.

8. A method of a tooling system, the method comprising:
providing an identifier tag that is affixed to a surface of a tool, the tool is one of an injection mold, fixture, or a die, a tool database having tool information including a predefined proximity associated with the identifier and a proximity device, tool design, and an image of the tool;
automatically activating, without a user-initiated scan, communication with at least one of the tool and the tool database in response to the identifier of the tool being within the predefined proximity; and
transferring tool information of the tool with respect to the tool database.

9. The method of claim 8, wherein the tool information includes a log of at least one of maintenance activity and production activity associated with the tool.

10. The method of claim 8, further comprising automatically initiating at least one of an alert and a notification.

11. The method of claim 8, wherein the tool information further includes at least two of design information, maintenance information instructions, tool condition, manufacture date, warranty information, and authenticity information.

12. The method of claim 8, wherein the identifier associated with the predefined proximity is at least one of quick response (QR) code and a radiofrequency identification (RFID).

13. The method of claim 8, further comprising concurrently displaying boxes, windows, areas, or buttons associated with the tool set-up information, design information, maintenance instructions, tool condition, manufacture date, warranty information, and authenticity information from the tool information of the tool database.

14. The method of claim 8, wherein the identifier includes an RFID tag, and further comprising transmitting tool information with respect to the RFID tag.

15. A tooling system to be used with an injection molding tool comprising:
an identifier tag that is configured to be connected to an injection molding tool;
a tool database that is configured to store information about an injection molding tool, tool design, and an image of the tool; and
a portable communication device that is configured to scan the identifier tag and provide location of an injection molding tool, the communication device is further configured to communicate with the tool database and display information of the injection molding tool that is stored in the tool database, the tool database is configured to store a location of the injection molding tool, the communication device is configured to transfer information of an injection molding tool to the tool database.

16. A tooling system comprising:
an identifier tag configured to be located on a tool, the tool may be one of a die, injection molding, or fixture;
a tool database that is configured to store information about history of a tool, tool design, and an image of a tool; and
a portable digital device that is configured to scan the identifier tag, the device is further configured to communicate with the tool database and display information about the tool that is stored in the tool database, the device is configured to provide information of a tool to the tool database.

17. The tooling system as claimed in claim 16, wherein the information further includes one of cycle count, tool usage, lifecycle count, run cycles, count data, and/or the location of the tool.

18. A system for tracking a tool comprising:
a QR tag configured to be located on a tool, the tool may be one of a die, mold, or fixture;
a tool database that is configured to store information about a tool; and
a handheld digital device that is configured to scan the QR tag, the handheld digital device is further configured to communicate with the tool databases, the digital device is also configured to display information about the tool, wherein the information that can be displayed includes:
tool design, cycle count, tool usage, lifecycle count, run cycles, count data, and/or the location of the tool.

* * * * *